United States Patent [19]

Kawagishi et al.

[11] Patent Number: 5,021,329

[45] Date of Patent: Jun. 4, 1991

[54] SILVER HALIDE PHOTOGRAPHIC MATERIAL CONTAINING A DYE PRECURSOR RESIDUE

[75] Inventors: Toshio Kawagishi; Atsuhiro Ohkawa; Seiji Ichijima, all of Minami-ashigara, Japan

[73] Assignee: Fuji Photo Film Co., Ltd., Kanagawa, Japan

[21] Appl. No.: 302,786

[22] Filed: Jan. 27, 1989

[30] Foreign Application Priority Data

Jan. 29, 1988 [JP] Japan .................................. 63-18636
Dec. 7, 1988 [JP] Japan ................................. 63-309206

[51] Int. Cl.$^5$ ......................... G03C 1/08; G03C 7/333
[52] U.S. Cl. .................................. 430/543; 430/542; 430/956; 430/958
[58] Field of Search ............... 430/223, 359, 542, 543, 430/956, 958, 226

[56] References Cited

U.S. PATENT DOCUMENTS

| | | | |
|---|---|---|---|
| 3,719,488 | 3/1973 | Locatell, Jr. et al. | 96/29 |
| 3,719,489 | 3/1973 | Cieciuch et al. | 96/29 |
| 4,468,448 | 8/1984 | Rogers | 430/222 |
| 4,468,449 | 8/1984 | Arbree et al. | 430/222 |
| 4,468,450 | 8/1984 | Meneghini et al. | 430/22 |
| 4,468,451 | 8/1984 | Foley | 430/222 |
| 4,535,051 | 8/1985 | Simon et al. | 430/222 |
| 4,606,991 | 8/1986 | Kawata et al. | 430/203 |
| 4,631,344 | 12/1986 | Simon et al. | 548/146 |
| 4,749,641 | 6/1988 | Kaufman et al. | 430/359 |
| 4,777,120 | 11/1988 | Lau | 430/359 |

FOREIGN PATENT DOCUMENTS 186868 6/1986 European Pat. Off. .
263984 4/1988 European Pat. Off. .

OTHER PUBLICATIONS

James, T. H., ed., The Theory of the Photographic Process, Fourth Edition, 1977, p. 337.

*Primary Examiner*—Charles L. Bowers, Jr.
*Assistant Examiner*—Janet C. Baxter
*Attorney, Agent, or Firm*—Birch, Stewart, Kolasch & Birch

[57] ABSTRACT

In accordance with the present invention a silver halide photographic material having at least one silver halide emulsion layer on a base, which comprises at least one of compound having a dye precursor residue is disclosed. The silver halide photographic material is high in sensitivity and improved in color reproduction.

19 Claims, No Drawings

5,021,329

SILVER HALIDE PHOTOGRAPHIC MATERIAL CONTAINING A DYE PRECURSOR RESIDUE

FIELD OF THE INVENTION

The present invention relates to a silver halide photographic material, and more particularly to a silver halide photographic material high in sensitivity and improved in color reproduction.

BACKGROUND OF THE INVENTION

In silver halide color photographic materials, in order to form a color image, use is made of dye-forming couplers (hereinafter referred to as couplers) that can couple with the oxidized product of an aromatic primary amine developing agent to form a yellow dye, a magenta dye, and a cyan dye. It is desirable that the yellow dye, the magenta dye, and the cyan dye formed from these couplers are ones that only absorb light in the blue range, the green range, and the red range, and that give bright hues. However, azomethine dyes of 5-pyrazolones that are currently and widely used have subsidiary absorption in the blue range, and phenol and naphthol type indoaniline dyes have undesirable absorption in the blue range and/or green range. Therefore, in order to correct color contamination due to this undesirable absorption, as one technique in color negative films, a masking technique of correcting color by using a colored coupler is employed. However, since colored couplers are a colored substance, basically they were accompanied by a lowering of sensitivity. For example, to correct the subsidiary absorption of green light of the formed dye of a cyan coupler, a magenta-colored cyan coupler is added in a red-sensitive layer itself. It was found that due to the absorption by this magenta-colored cyan coupler on the longer wavelength side, the amount of light on the shorter wavelength side for the red-sensitive layer became insufficient. For instance, when phenol-type cyan couplers having a 2-ureido group, disclosed in U.S. Pat. Nos. 4,333,999, or 4,451,559, are used as a cyan coupler, since their developed dyes have much of the above-mentioned subsidiary adsorption, it is required to use a magenta-colored cyan coupler, which results in a conspicuous lowering of the sensitivity of the red layer.

Further, it was found that, for the same reason, if a yellow-colored magenta coupler was used in a green-sensitive layer, the amount of light on the shorter wavelength side for the green-sensitive layer became insufficient, resulting in a lowering of the sensitivity.

Further, for a multilayer color negative film having a blue-sensitive layer, a green-sensitive layer, and a red-sensitive layer, if a colored coupler is used in an upper layer, since light is absorbed there, the sensitivity of the lower layer naturally lowers. In a multilayer film having a blue-sensitive emulsion layer and a green-sensitive emulsion layer that are coated in the stated order from the exposure plane, there arise the following disadvantages. In common subtractive color negative films, the blue-sensitive emulsion layer contains as an image-forming coupler a coupler that will develop to yellow. In order to correct undesired subsidiary absorption of green light of the formed dye of this yellow coupler, it is required that a magenta-colored coupler is used together with a yellow coupler in the blue-sensitive emulsion layer. However, in this case the amount of light for the green-sensitive emulsion layer situated below becomes insufficient, resulting in a fatal lowering of the sensitivity. For the same reason, in a multilayer negative film having a green-sensitive emulsion layer as the uppermost layer, it was difficult to use a yellow-colored coupler together with a magenta coupler.

BRIEF SUMMARY OF THE INVENTION

The object of the present invention is to solve the above problems in silver halide photographic materials. That is, the object of the present invention is to provide a photographic material that contains a compound which, when exposed, is colorless or has only a substantially harmless color, but that can produce a dye having a hue suitable for color masking when developed.

Another object of the present invention is to provide a color photographic material in which a new mode for color masking is employed.

A further object of the present invention is to provide a dye precursor compound to be employed on the mode for color masking.

Other and further objects, features, and advantages of the invention will appear more fully from the following description.

DETAILED DESCRIPTION OF THE INVENTION

The above object of the present invention has been attained by a silver halide photographic material having at least one silver halide emulsion layer on a base, which comprises at least one of the compounds having a dye precursor residue represented by the following formula (I):

$$A\text{-}B \qquad \text{Formula (I)}$$

wherein A represents a group capable of releasing B imagewise as a function of the development of a silver halide, and B represents a residue capable of converting the remaining unreacted A-B to a dye having absorption in the visible range by a reaction in the presence of silver(I) ions or a soluble silver complex in the developing process.

Preferably, the compound represented by formula (I) is one that will react with the oxidized product of a developing agent which will be produced along with the development of a silver halide in the developing solution, thereby releasing B, and preferably B is a residue that will diffuse into the processing solution after splitting off from A. The compound A-B represented by formula (I) that has not reacted with the oxidized product of a developing agent will remain in the emulsion layer, and it will react with silver(I) ions or a soluble silver complex uniformly present in the emulsion layer when processed, for example, in the fixing step, in the bleach-fixing step, or other processing step, thereby forming a dye having absorption in the visible range.

Hitherto, as photographic material, photographic materials wherein a dye intermediate or a dye precursor is reacted in the presence of silver ions or a soluble silver complex to form an image are known (U.S. Pat. Nos. 3,719,488, 3,719,489, 4,468,449, 4,468,450, 4,468,451, 4,535,051, and 4,631,344), but in order to form an image, it is required that silver ions or a soluble silver complex are distributed imagewise during the development or after development, which requirement is different from the present invention. Further, in the present invention it is intended that the dye thus formed is used for masking the correction of a color or for forming an image, and as the image is formed by the reaction of the so-called color-developing coupler residue or the redox residue represented by A, it is not necessary that silver ions and the like are distributed imagewise. In formula (I), it is preferable that, in the state wherein the residue B bonds to A, it is substantially colorless and has no absorption in the visible light range. In this respect the photographic material of the present invention is completely different from photographic products described, for example, in U.S. Pat. Nos. 3,719,487 and 3,719,489.

The compound represented by formula (I) in the present invention is preferably one represented by the following formula (II):

A-L-Dp-(Sol)$_n$                             Formula (II)

wherein A represents a group capable of splitting off L-Dp-(Sol)$_n$ by a reaction with the oxidized product of a developing agent, L represents a divalent linking group, Dp represents a dye precursor residue capable of producing a dye having absorption in the visible light range by a reaction with a silver(I) ion or a soluble silver complex, Sol represents a water-soluble group, and n is an integer of 1 or larger.

The reactions of the compound represented by formula (II) that will take place at the time of the developing process will now be described.

Scheme 1 (the reaction that will take place at the part where the oxidized product of a developing agent is formed)

A-L-Dp-(Sol)n $\xrightarrow{T^+}$ L-Dp-(Sol)n

T$^+$: the oxidized product of a developing agent.

Scheme 2 (the reaction that will take place at the portion where the oxidized product of a developing agent is not formed)

A-L-Dp-(Sol)n $\xrightarrow{Ag^+}$ A-L-D-(Sol)n

In the above equations, D represents the dye that will be formed from Dp, and others have the same meanings as defined in formula (II).

As shown in schemes 1 and 2 above, at the portion where the oxidized product of a developing agent is formed, by the reaction between the compound represented by formula (II) and the oxidized product of a developing agent, L-Dp-(Sol)$_n$ is produced, and when n is 1 or greater, L-Dp-(Sol)$_n$ will dissolve into the processing solution due to the effect of the water-soluble group. On the other hand, at the portion where the oxidized product of a developing agent is not formed, when the concentration of the silver(I) ions or the soluble silver ion complex in the film becomes high, by a reaction between the dye precursor Dp and a silver(I) ion or a soluble silver ion complex, the dye A-L-D-(Sol)$_n$ is formed.

As the reaction wherein a dye is formed by the reaction with a silver(I) ion or a soluble silver ion complex, use can be made of the reaction between a thioacetal and a metal ion described, for example, in J. Chem. Soc. Perkin II, 1191 (1980). Thioacetals are very stable compounds under from weak acidic to basic conditions, and that can be used as protective groups of a carbonyl group, etc. of intermediates in organic synthesis. However, it is considered that when thioacetals are present together with metal ions very high in affinity for sulfur, such as silver ions, mercury ions, and thallium ions, the thioacetal coordinates to the involved metal to greatly polarize the carbon-sulfur bond, thus it will easily undergo nucleophilic attack by the oxygen atom of water in an aqueous solution, and therefore hydrolysis proceeds rapidly. Accordingly, by combining a dye having a carbonyl group or an imino group in the chromophore with this reaction, it has become possible to form a dye by the reaction with a silver(I) ion or a soluble silver ion complex. If a suitable ballasting group is made bonded to A, the A-L-D-(Sol)$_n$ is immobilized and a dye image is formed. That is, if a compound represented by formula (II) is used in a negative color photographic material, a masking effect similar to the conventional case wherein a colored coupler is used can be secured. In addition, since the compound represented by formula (II) is colorless or has a substantially harmless color, the photographic sensitivity will not be lowered by the so-called internal absorption (which means that the photosensitive silver halide does not contribute to the formation of a latent image, since the wavelength component of the incident light to be absorbed by the silver halide is absorbed by a dye coexisting in the same layer of the emulsion), and therefore color masking can be effected in a very preferable form. In this case, the reaction of scheme 1 takes place mainly in the developing solution, and the reaction of scheme 2 may take place partially in the developing solution, but most of the reaction take place in a fixing solution, a bleach-fixing solution, or a processing solution containing silver ions that is additionally employed.

Besides the use of the present compound represented by formula (I) as a masking compound in color negative film as described above, the present compound represented by formula (I) can be used in the image-forming process, wherein it is used in combination with a negative emulsion or a positive emulsion to form a positive color image or a negative color image.

The compound represented by formula (I) or (II) will now be described in more detail.

A in formulae (I) and (II) represents particularly a coupler residue or a redox group.

When A represents a coupler residue, known coupler residues may be used, such as a yellow-coupler residue (e.g. an open chain ketomethylene-type coupler residue), a magenta-coupler residue (e.g. a 5-pyrazolone type, pyrazoloimidazole type, and pyrazolotriazole-type coupler residue), a cyan-coupler residue (e.g. a phenol type, and naphthol-type coupler residue), and a non-dye-forming coupler (e.g. an indanone type and acetophenone-type coupler residue). Also, heterocyclic-type coupler residues may be used that are described in U.S. Pat. Nos. 4,315,070, 4,183,752, 3,961,959, and 4,171,223.

When A in formulae (I) and (II) represents a coupler residue, preferable examples of A are coupler residues represented by the following formula: (Cp-1), (Cp-2), (Cp-3), (Cp-4), (Cp-5), (Cp-6), (Cp-7), (Cp-8), or (Cp-9). These couplers are preferable because the coupling speed is high.

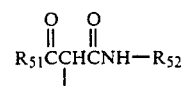

Formula(Cp-1)

-continued

Formula(Cp-2)

$$R_{52}NHCOCHCNHR_{53}$$
 (with carbonyl groups, central CH)

Formula(Cp-3)

[pyrazolone structure with $R_{54}$, $R_{55}$]

Formula(Cp-4)

[pyrazolotriazole structure with $R_{56}$, $R_{57}$, NH]

Formula(Cp-5)

[pyrazoloazole structure with $R_{56}$, $R_{57}$, NH]

Formula(Cp-6)

[phenol with OH, NHCO—$R_{58}$, $(R_{59})_d$]

Formula(Cp-7)

[phenol with OH, NHCONH—$R_{60}$, $(R_{59})_d$]

Formula(Cp-8)

[naphthol with OH, CONH—$R_{61}$, $(R_{62})_e$]

Formula(Cp-9)

[indanone structure with $(R_{63})_e$]

In the above formulae, the -L-Dp-(Sol)$_n$ group bonds to the free bond line extending from the coupling position.

In the above formulae, when $R_{51}$, $R_{52}$, $R_{53}$, $R_{54}$, $R_{55}$, $R_{56}$, $R_{57}$, $R_{58}$, $R_{59}$, $R_{60}$, $R_{61}$, $R_{62}$, or $R_{63}$ contains a ballast group, it is selected such that the total number of carbon atoms is 8 to 40, preferably 10 to 30, and in other cases the total number of carbon atoms is preferably 15 or less. For a bis type, telomer type, or polymer-type coupler, any one of the above substituents represents a divalent group to connect repeating units or the like. In that case, the range of the carbon atoms may be outside the definition above-described.

$R_{51}$ to $R_{63}$, d, and e will now described in more detail. In the following, $R_{41}$ represents an aliphatic group, an aromatic group, or a heterocyclic group; $R_{42}$ represents an aromatic group or a heterocyclic group; $R_{43}$, $R_{44}$, and $R_{45}$ each represent a hydrogen atom, an aliphatic group, an aromatic group, or a heterocyclic group.

$R_{51}$ has the same meaning as that of $R_{41}$. $R_{52}$ and $R_{53}$ each have the same meaning as that of $R_{42}$. $R_{54}$ has the same meaning as that of $R_{41}$, or it represents $$R_{41}CON-,\ R_{41}N-,\ R_{41}SO_2N-,\ R_{41}S-,\ R_{43}O-,$$
$$\quad\ |\quad\quad\ |\quad\quad\ |$$
$$\quad R_{43}\quad R_{43}\quad R_{43}$$

$$R_{45}NCON-,\ R_{41}OOC-,\ R_{44}NCO-,\ \text{or}\ N\equiv C-.$$
$$\ |\quad\ |\quad\quad\quad\quad\quad\ |$$
$$R_{43}\ R_{44}\quad\quad\quad\quad\ R_{43}$$

$R_{55}$ has the same meaning as that of $R_{41}$. $R_{56}$ and $R_{57}$ each have the same meaning as that of $R_{43}$, or each represents $R_{41}S-$, $R_{43}O-$, $$R_{41}CON-,\ R_{41}N-,\ R_{43}NCON-,\ \text{or}\ R_{41}SO_2N-.$$
$$\quad\ |\quad\quad\ |\quad\quad\ |\quad\ |\quad\quad\quad\quad\ |$$
$$\quad R_{43}\quad R_{43}\quad R_{44}\ R_{45}\quad\quad\quad R_{43}$$

$R_{58}$ has the same meaning as that of $R_{41}$. $R_{59}$ has the same meaning as that of $R_{41}$, or it represents $$R_{41}CON-,\ R_{41}OCON-,\ R_{41}SO_2N-,$$
$$\quad\ |\quad\quad\quad\ |\quad\quad\quad\quad\ |$$
$$\quad R_{43}\quad\quad\ R_{43}\quad\quad\quad R_{43}$$

$$R_{43}NCON-,\ R_{43}NSO_2N-,$$
$$\ |\quad\ |\quad\quad\quad\ |\quad\ |$$
$$R_{44}\ R_{43}\quad\quad R_{44}\ R_{45}$$

$R_{41}O-$, $R_{41}S-$, a halogen atom, or $$R_{41}N-.$$
$$\ |$$
$$R_{43}$$

d is form 0 to 3. When there are a plurality of d's, $R_{59}$'s represent the same substituent or different substituents. $R_{59}$'s may be divalent groups linked to form a cyclic structure. As examples of such a divalent group to form a cyclic structure can be mentioned

[three cyclic structures with $(R_{41})_f$, $(R_{41})_g$, $R_{43}$, $R_{44}$]

wherein f is an integer of 0 to 4, and g is an integer of 0 to 2.

$R_{60}$ has the same meaning as that of $R_{41}$. $R_{61}$ has the same meaning as that of $R_{41}$. $R_{62}$ has the same meaning as that of $R_{41}$, or it represents $R_{41}CONH-$, $R_{41}O-CONH-$, $R_{41}SO_2NH-$, $$R_{43}NCON-,\ R_{43}NSO_2N-,$$
$$\ |\quad\ |\quad\quad\quad\ |\quad\ |$$
$$R_{44}\ R_{45}\quad\quad R_{44}\ R_{45}$$

$R_{43}O-$, $R_{41}S-$, a halogen atom, or

$R_{63}$ has the same meaning as that of $R_{41}$, or it represents

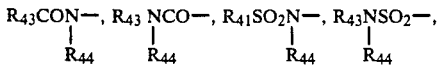

$R_{41}SO_2-$, $R_{43}OCO-$, $R_{43}O-SO_2-$, a halogen atom, a nitro group, a cyano group, or a group $R_{43}CO-$. e is an integer of 0 to 4. When there are a plurality of $R_{62}$'s or $R_{63}$'s, they may be the same or different.

In the above, the aliphatic group is a saturated or unsaturated, chain-like or cyclic, linear or branched, and substituted or unsubstituted aliphatic hydrocarbon group having 1 to 32 carbon atoms, preferably 1 to 22 carbon atoms. Typical examples thereof are methyl, ethyl, propyl, isopropyl, butyl, (t)-butyl, (i)-butyl, (t)-amyl, hexyl, cyclohexyl, 2-ethylhexyl, octyl, 1,1,3,3-tetramethylbutyl, decyl, dodecyl, hexadecyl, and octadecyl groups.

Here the aromatic group refers to one having 6 to 20 carbon atoms, and it is preferably a substituted or unsubstituted phenyl group, or a substituted or unsubstituted naphthyl group.

Here the heterocyclic group refers to one having 1 to 20 carbon atoms, preferably 1 to 7 carbon atoms, and it is preferably a 3 to 8-membered substituted or unsubstituted heterocyclic group whose hetero-atom is selected from a nitrogen atom, an oxygen, atom or a sulfur atom. Typical examples of the heterocyclic group are 2-pyridyl, 4-thienyl, 2-furyl, 2-imidazolyl, pyrazinyl, 2-pyrimidinyl, 1-imidazolyl, 1-indolyl, phthalimido, 1,3,4-thiadiazol-2-yl, benzoxazol-2-yl, 2-quinolyl, 2,4-dioxo-1,3-imidazolydin-5-yl, 2,4-dioxo-1,3-imidazolydin-3-yl, succinimido, phthalimido, 1,2,4-triazol-2-yl, and 1-pyrazolyl groups.

When the above aliphatic hydrocarbon group, aromatic group, and heterocyclic group have a substituent, typical substituents include a halogen atom, $R_{47}O-$, $R_{46}S-$,

$R_{46}SO_2-$, $R_{47}OCO-$,

a group having the same meaning as that of $R_{46}$,

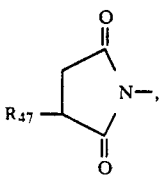

$R_{46}COO-$, $R_{47}OSO_2$, a cyano group, and a nitro group. Here, $R_{46}$ represents an aliphatic group, an aromatic group, or a heterocyclic group, $R_{47}$, $R_{48}$, and $R_{49}$ each represent an aliphatic group, an aromatic group, a heterocyclic group, or a hydrogen atom, and the aliphatic group, the aromatic group, and the heterocyclic group have the same meanings as defined above.

Preferable ranges of $R_{51}$ to $R_{63}$, d, and e will now be described.

$R_{51}$ is preferably an aliphatic group or an aromatic group. $R_{52}$, $R_{53}$, and $R_{54}$ each are preferably an aromatic group. $R_{54}$ is preferably $R_{41}CONH-$ or

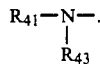

$R_{56}$ and $R_{57}$ each are preferably an aliphatic group, an aromatic group, $R_{41}O-$, or $R_{41}S-$.

$R_{58}$ is preferably an aliphatic group or an aromatic group.

In formula (Cp-6), $R_{59}$ is preferably a chlorine atom, an aliphatic group, or $R_{41}CONH-$. d is preferably 1 or 2. $R_{60}$ is preferably an aromatic group. In formula (Cp-7), $R_{59}$ is preferably $R_{41}CONH-$. In formula (Cp-7), d is preferably 1. $R_{61}$ is preferably an aliphatic group or an aromatic group. In formula (Cp-8), e is preferably 0 or 1. $R_{62}$ is preferably $R_{41}OCONH-$, $R_{41}CONH-$, or $R_{41}SO_2N-$, and its position of the substitution is preferably in the 5-position of the naphthol ring. $R_{63}$ is preferably $R_{41}CONH-$, $R_{41}SO_2NH-$,

$R_{41}SO_2-$,

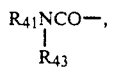

a nitro group or a cyano group.

Now, typical examples of $R_{51}$ to $R_{63}$ will be described.

As $R_{51}$ can be mentioned a (t)-butyl, 4-methoxyphenyl, phenyl, 3-{2-(2,4-di-t-amylphenoxy)butaneamido}phenyl, 4-octadecyloxyphenyl, or a methyl group. As $R_{52}$ and $R_{53}$ can be mentioned a 2-chloro-5-dodecyloxycarbonylphenyl, 2-chloro-5-hexadecylsulfonamidophenyl, 2-chloro-5-tetradecaneamidophenyl, 2-chloro-5-{4-(2,4-di-t-amylphenoxy)butaneamido}phenyl, 2-chloro-5-{2-(2,4-di-t-amylphenoxy)butaneamido}phenyl, 2-methoxyphenyl, 2-methoxy-5-tetradecyloxycarbonylphenyl, 2-chloro-5-(1-ethoxycarbonylethoxycarbonyl)phenyl, 2-pyridyl, 2-chloro-5-octyloxycarbonylphenyl, 2,4-dichlorophenyl, 2-chloro-5-(1-dodecyloxycarbonylethoxycarbonyl)phenyl, 2-chlorophenyl, or 2-ethoxyphenyl group. As $R_{54}$ can be mentioned a 3-{2-(2,4-di-t-amylphenoxy)butaneamido}benzamido, 3-{4-(2,4-di-t-amylphenoxy)butaneamido}benzamido, 2-chloro-5-tetradecaneamidoanilino, 5-(2,4-di-t-amylphenoxyacetamido)benzamido, 2-chloro-5-dodecenylsuccinimidoanilino, 2-chloro-5-{2-(3-t-butyl-4-hydroxyphenoxy)tetradecaneamido}anilino, 2,2-dimethylpropaneimido, 2-(3-pentadecylphenoxy)butaneamido, pyrrolidino, or N,N-dibutylamino group. As an preferable example of $R_{55}$ can be mentioned a 2,4,6-trichlorophenyl, 2-chlorophenyl, 2,5-dichlorophenyl, 2,3-dichlorophenyl, 2,6-dichloro-4-methoxyphenyl, 4-{2-(2,4-di-t-amylphenoxy)butaneamido}phenyl, or 2,6-dichloro-4-methanesulfonylphenyl group. As $R_{56}$ can be mentioned a methyl, ethyl, isopropyl, methoxy, ethoxy, methylthio, ethylthio, 3-phenylureido, 3-butylureido, or 3-(2,4-di-t-amylphenoxy)propyl group. As $R_{57}$ can be mentioned a 3-(2,4-di-t-amylphenoxy)propyl, 3-[4-{2-[4-(4-hydroxyphenylsulfonyl)phenoxy]-tetradecaneamido}phenyl]propyl, methoxy, ethoxy, methylthio, ethylthio, methyl, 1-methyl-2-{2-octyloxy-5-[2-octyloxy-5-(1,1,3,3-tetramethylbutyl)phenylsulfonamido]phenylsulfonamido}ethyl, 3-{4-(4-dodecyloxyphenylsulfonamido)phenyl}propyl, 1,1-dimethyl-2-{2-octyloxy-5-(1,1,3,3-tetramethylbutyl)-phenylsulfonamido}ethyl, or dodecylthio group. As $R_{58}$ can be mentioned a 2-chlorophenyl, pentafluorophenyl, heptafluoropropyl, 1-(2,4-di-t-amylphenoxy)propyl, 3-(2,4-di-t-amylphenoxy)propyl, 2,4-di-t-amylmethyl, or furyl group. As $R_{59}$ can be mentioned a chlorine atom, or a methyl, ethyl, propyl, butyl, isopropyl, 2-(2,4-di-t-amylphenoxy)butaneamido, 2-(2,4-di-t-amylphenoxy)hexaneamido, 2-(2,4-di-t-octylphenoxy)octaneamido, 2-(2-chlorophenoxy)tetradecaneamido, 2,2-dimethylpropaneamido, 2-{4-(4-hydroxyphenylsulfonyl)phenoxy}tetradecaneamido, or 2-{2-(2,4-di-t-amylphenoxyacetamido)phenoxy} butaneamido group. As $R_{60}$ can be mentioned a 4-cyanophenyl, 2-cyanophenyl, 4-butylsulfonylphenyl, 4-propylsulfonylphenyl, 4-ethoxycarbonylphenyl, 4-N,N-diethylsulfamoylphenyl, 3,4-dichlorophenyl, or 3-methoxycarbonylphenyl group. As $R_{61}$ can be mentioned a dodecyl, hexadecyl, cyclohexyl, butyl, 3-(2,4-di-t-amylphenoxy)propyl, 4-(2,4-di-t-amylphenoxy)butyl, 3-dodecyloxypropyl, 2-tetradecyloxyphenyl, t-butyl, 2-(2-hexyldecyloxy)phenyl, 2-methoxy-5-dodecyloxycarbonylphenyl, 2-butoxyphenyl, or 1-naphthyl group. As $R_{62}$ can be mentioned an isobutyloxycarbonylamino, ethoxycarbonylamino, phenylsulfonylamino, methanesulfonamido, butanesulfonamido, 4-methylbenzenesulfonamido, benzamido, trifuloroacetamido, 3-phenylureido, butoxycarbonylamino, or acetamido group. As $R_{63}$ can be mentioned a 2,4-di-t-amylphenoxyacetamido, 2-(2,4-di-t-amylphenoxy)butaneamido, hexadecylsulfonamido, N-methyl-N-octyldecylsulfamoyl, N,N-dioctylsulfamoyl, or dodecyloxycarbonyl group, a chlorine atom, a fluorine atom, or a nitro, cyano, N-3-(2,4-di-t-amylphenoxy)propylsulfamoyl, methanesulfonyl, or hexadecylsulfonyl group.

When A in formulae (I) and (II) represents a redox group, particularly it is one represented by the following formula (III):

$A_1\text{-P-}(X=Y)_l\text{-Q-}A_2$  Formula (III)

wherein P and Q independently each represent an oxygen atom or a substituted or unsubstituted imino group, at least one of X and Y that is l in number represents a methine group having, as a substituent, -(L)-Dp-(Sol)$_n$, and other X and Y each represent a substituted or unsubstituted methine group or a nitrogen atom, l is an integer of 1 to 3 (X that is l in number and Y that is l in number may be the same or different), $A_1$ and $A_2$ each represent a hydrogen atom or a group that can be removed by an alkali, and any two substituents of P, X, Y, Q, $A_1$, and $A_2$ may be divalent groups that bond with each other to form a cyclic structure. For example, $(X=Y)_l$ forms a benzene ring or a pyridine ring.

When P and Q each represent a substituted or unsubstituted imino group, preferably it is an imino group substituted by a sulfonyl group or an acyl group.

In that case, P and Q can be represented as follows:

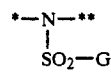  Formula (N-1)

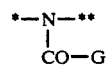  Formula (N-2)

wherein the mark * represents the position where it bonds to $A_1$ or $A_2$, the mark ** represents the position where it bonds to one of the free bond lines of -(X=Y)$_l$-, and G preferably, for example, represents a linear or branched, chain or cyclic, saturated or unsaturated, and substituted or unsubstituted aliphatic group having 1 to 32 carbon atoms, preferably 1 to 22 carbon atoms (e.g. methyl, ethyl, benzyl, phenoxybutyl, or isopropyl), a substituted or unsubstituted aromatic group having 6 to 10 carbon atoms (e.g. phenyl, 4-methylphenyl, 1-naphthyl, or 4-dodecyloxyphenyl), or a 4- to 7-membered heterocyclic group whose hetero-atom is selected from a nitrogen atom, a sulfur atom, or an oxygen atom (e.g. 2-pyridyl, 1-phenyl-4-imidazolyl, 2-furyl, or benzothienyl).

In formula (III), preferably P and Q each independently represent an oxygen atom or a group represented by formula (N-1).

When $A_1$ and $A_2$ each represent a group that can be removed by an alkali (hereinafter referred to as a precursor group), for example, it is preferably a group that can be hydrolyzed, such as an acyl group, an alkoxycarbonyl group, an aryloxycarbonyl group, a carbamoyl group, an imidoyl group, an oxazolyl group, or a sulfonyl group, a precursor group of the type that utilizes the reverse Michael reaction, described in U.S. Pat. No. 4,009,029, a precursor group of the type that utilizes an anion produced after the ring-opening reaction as an intramolecular nucleophilic group, described in U.S. Pat. No. 4,310,612, a precursor group wherein the electron transfer of an anion takes place through a conjugated system, thereby causing a cleavage reaction, described in U.S. Pat. Nos. 3,674,478, 3,932,480, or 3,993,661, a precursor group wherein the electron transfer of an anion reacted after ring-opening causes a cleavage reaction, described in U.S. Pat. No. 4,335,200, or a precursor group that utilizes an imidomethyl group, described in U.S. Pat. Nos. 4,363,865 or 4,410,618.

In formula (III), preferably P represents an oxygen atom, and $A_2$ represents a hydrogen atom.

In formula (III), excluding that X and Y each represent a methine group having -L-Dp-(Sol)$_n$ as a substituent, more preferably the other X and Y each represent a substituted or unsubstituted methine group.

Particularly preferable compounds of the groups represented by formula (III) are represented by the following formula (IV) or (V):

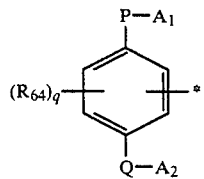

Formula (IV)

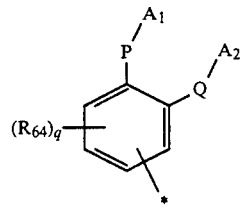

Formula (V)

wherein the mark * represents the position wherein -L-Dp-(Sol)$_n$ bonds, P, Q, A$_1$, and A$_2$ have the same meanings as defined for formula (III), R$_{64}$ represents a substituent, q is an integer of 0 to 3, and when q is 2 or more, two or more R$_{64}$'s may be the same or different, and when two R$_{64}$'s are substituents on adjacent carbon atoms, they may be divalent groups that bond with each other to form a cyclic structure. When two such R$_{64}$'s form a cyclic structure, it is a benzene-fused ring, such as naphthalenes, benzonorbornenes, chromans, indoles, benzothiophenes, quinolines, benzofurans, 2,3-dihydrobenzofurans, indanes, or indenes, which may have further one or more substituents. Examples of preferable substituents, when these fused rings have substituents, and preferable examples of R$_{64}$ when R$_{64}$ does not form a fused ring are R$_{41}$, a halogen atom, R$_{43}$O—, R$_{43}$S—,

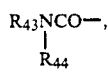

R$_{43}$OOC—, R$_{41}$SO$_2$—,

R$_{43}$CO—, R$_{41}$COO—, R$_{41}$SO—,

a cyano group,

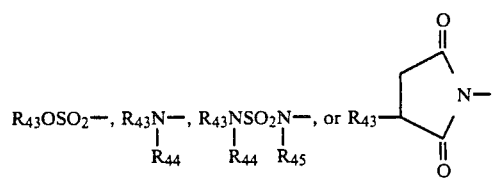

In the above formulae, R$_{41}$, R$_{43}$, R$_{44}$, and R$_{45}$ have the same meaning as defined above. Typical examples of R$_{64}$ are a methyl, ethyl, t-butyl, methoxy, methylthio, dodecylthio, 3-(2,4-di-t-amylphenoxy)propylthio, N-3-(2,4-di-t-amylphenoxy)propylcarbamoyl, N-methyl-N-octadecylcarbamoyl, methoxycarbonyl, dodecyloxycarbonyl, propylcarbamoyl, hydroxyl, and N,N-dioctylcarbamoyl group. As an example of the ring formed by two R$_{64}$'s can be mentioned a group represented by

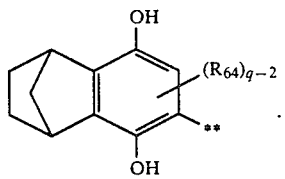

In formulae (IV) and (V), preferably P and Q each represent an oxygen atom.

In formulae (IV) and (V), preferably A$_1$ and A$_2$ each represent a hydrogen atom.

The linking group represented by L in formula (II) is preferably a divalent linking group represented by the following formula (VI), or one of known linking groups given later.

*-Z$_{11}$-L$_1$-**      Formula (VI)

wherein the mark * represents the position where it bonds to A of formula (II), the mark ** represents the position where it bonds to Dp of formula (II), Z$_{11}$ represents an oxygen atom, a sulfur atom,

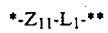

L$_1$ represents simply a bond or a divalent group, and R$_{71}$ has the same meaning as that of R$_{43}$ described above. As the divalent group represented by L$_1$ can be mentioned an alkylene group (e.g. methylene, 1,2-ethylene, 1,3-propylene, 1-methyl-1,2-ethylene, 1,4-butylene, 1,8-octylene, and 1,10-decylene), an arylene group (e.g. 1,2-phenylene, 1,3-phenylene, 1,4-phenylene, and 1,4-naphthalene), an oxygen atom, a sulfur atom,

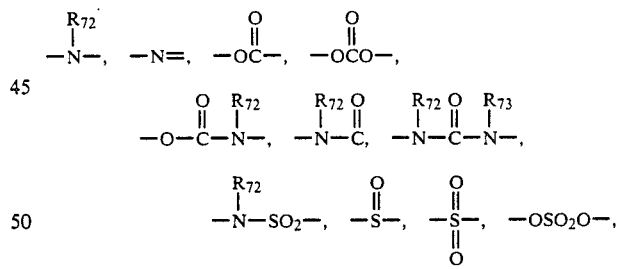

or a carbonyl group, or a group formed by combining these groups. R$_{72}$ and R$_{73}$ have the same meaning as those of R$_{43}$ described above.

Concrete examples of the group represented by formula (VI) are shown, for example, below.

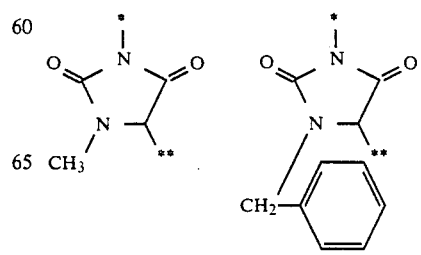

-continued

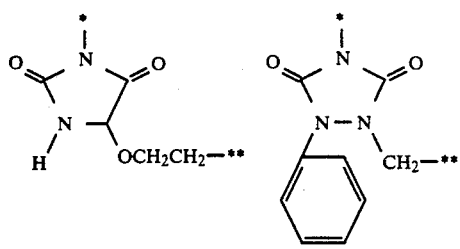

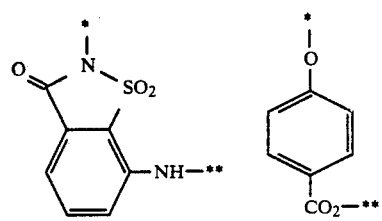

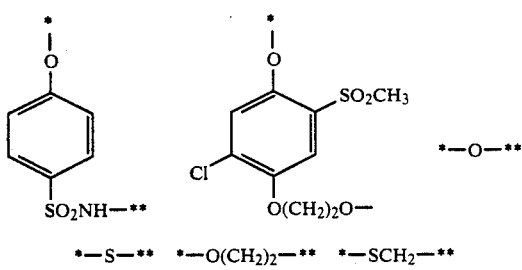

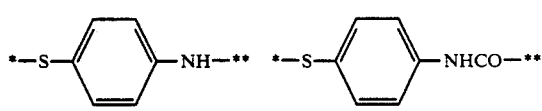

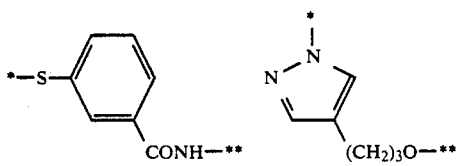

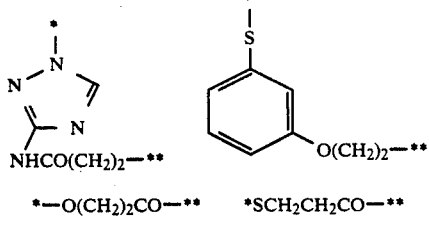

The marks * and ** have the same meanings as described in formula (VI).

In formula (II), the group represented by L may be any one of the below-mentioned linking groups.

Preferable examples of these linking groups are those that bond to the hetero-atom contained in Dp, for example to the oxygen atom, the sulfur atom, or the nitrogen atom.

(1) Groups that Utilize the Cleavage Reaction of Hemiacetals.

These are described, for example, in U.S. Pat. No. 4,146,396, JP-A ("JP-A" means unexamined published Japanese patent application) Nos. 249148/1985 and 249149/1985, and they are groups represented by the formula given below. Here, the mark * represents the position where it bonds to the left side in formula (II), and the mark ** represents the position where it bonds to the right side in formula (II).

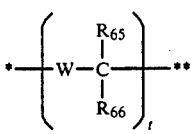

Formula (T-1)

wherein W represents an oxygen atom, a sulfur atom, or a group

$R_{65}$ and $R_{66}$ each represent a hydrogen atom or a substituent, $R_{67}$ represents a substituent, t is 1 or 2, and when t is 2, two

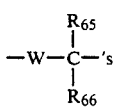

may be the same or different. When $R_{65}$ and $R_{66}$ each represent a substituent, typical examples of $R_{67}$ include $R_{69}$, $R_{69}CO-$, $R_{69}SO_2$,

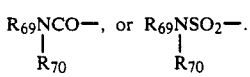

Here, $R_{69}$ has the same meaning as that described for $R_{41}$, and $R_{70}$ has the same meaning as that described for $R_{43}$. $R_{65}$, $R_{66}$, and $R_{67}$ each may represent a divalent group that bonds to form a cyclic structure. Specific examples of the group represented by formula (T-1) include the following groups:

*—OCH$_2$—**

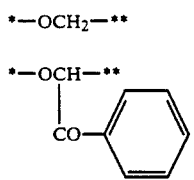

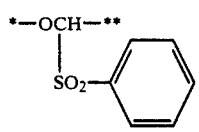

*—SCH$_2$—**

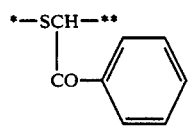

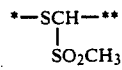

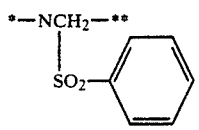

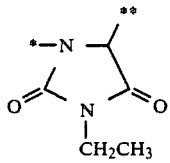

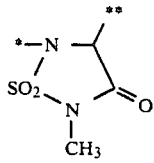

(2) Groups that Utilize an Intramolecular Nucleophilic Substitution Reaction to Effect the Splitting Reaction.

These include timing groups described, for example, in U.S. Pat. No. 4,248,962, and they can be represented by the following formula:

\*-Nu-Link-E-\*\*            Formula (T-2)

wherein the mark * represents the position where it bonds to the left side in formula (II), the mark  represents the position where it bonds to the right side in formula (II), Nu represents a nucleophilic group, examples of the nucleophilic nuclide being an oxygen atom and a sulfur atom, E represents an electrophilic group, which is a group that will undergo nucleophilic attack from Nu and can split the bond to the mark , and Link represents a linking group that relates Nu and E sterically so they can undergo an intramolecular nucleophilic substitution reaction.

Specific examples of the group represented by formula (T-2) are the following:

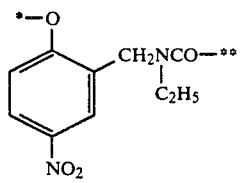

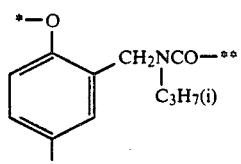

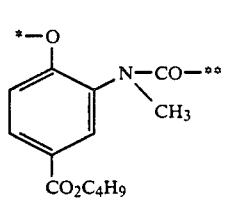

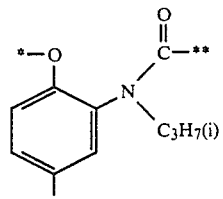

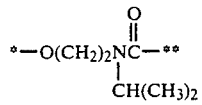

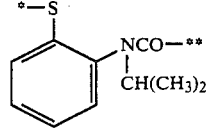

(3) Groups that Utilize an Electron Transfer Reaction Along a Conjugated System to Cause a Cleavege Reaction.

These are described, for example, in U.S. Pat. Nos. 4,409,323 or 4,421,845, and they are groups represented by the following formula:

Formula (T-3)

wherein the mark *, the mark **, W, $R_{65}$, $R_{66}$, and t have the same meanings as those described for (T-1). Specific examples thereof are the following groups:

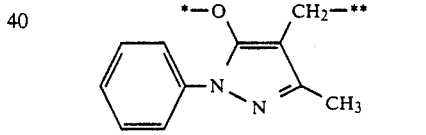

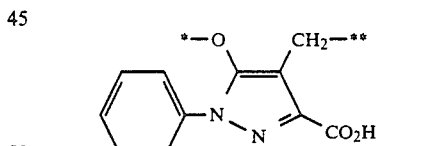

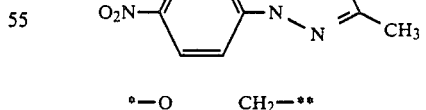

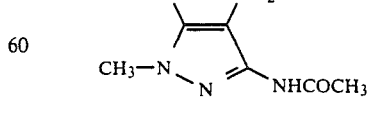

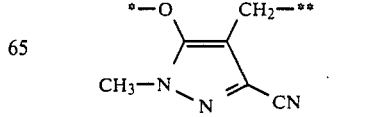

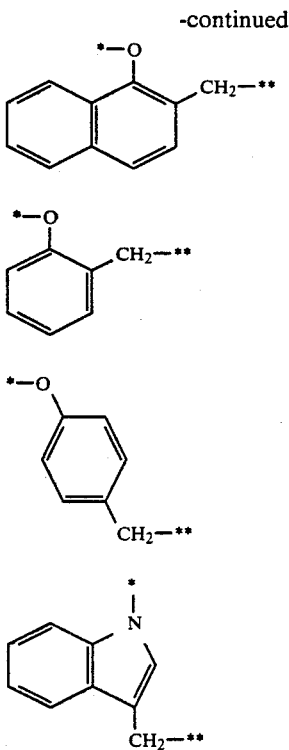

(4) Groups that Utilize a Cleavage Reaction by Hydrolysis of Esters.

These are linking groups described, for example, in German Offenlegungschrift No. 2,626,315, and examples thereof are the groups given below.

In formulae (T-4) and (T-5) given below, the mark * and the mark ** have the same meanings as those described for formula (T-1).

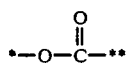
Formula (T-4)

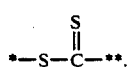
Formula (T-5)

(5) Groups that Utilize a Splitting Reaction of Iminoketals.

They are linking groups described, for example, in U.S. Pat. No. 4,546,073 which are represented by the following formula:

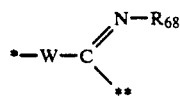

wherein the mark *, the mark **, and W have the same meanings as those described for (T-1), and $R_{68}$ has the same meaning as that for $R_{67}$. Specific examples of the group represented by formula (T-6) are the following groups:

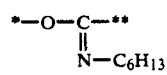

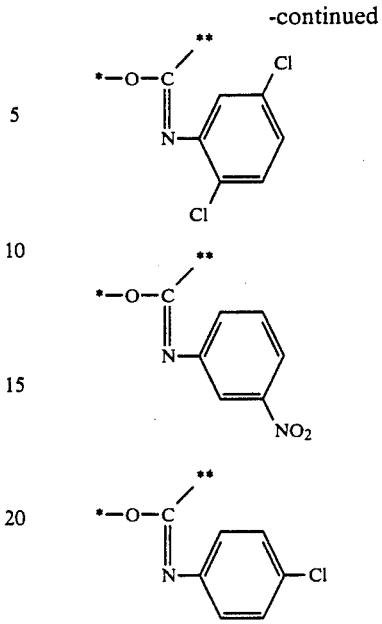

In formula (II), Dp more particularly represents a dye precursor residue in which the hybridized state of the orbits of the carbon atom of the carbonyl group or the imino group in the chromophore is made into $SP^3$, thereby causing it to have substantially no absorption in the visible light range or causing the absorption wavelength temporarily to be shifted to the shorter wavelength range, and when the group reacts with a silver(I) ion or a soluble silver complex, said dye will be produced. Preferably, Dp is represented by the following formula (VII):

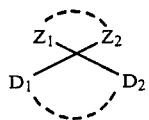
Formula (VII)

wherein $Z_1$ and $Z_2$ may be the same or different, $Z_1$ represents $R_{74}S-$, $Z_2$ represents $R_{75}S-$, $R_{75}O-$,

$Z_1$ and $Z_2$ may bond together to form a ring, $R_{74}$ and $R_{75}$ have the same meaning as that described for $R_{41}$, $R_{76}$ has the same meaning as that described for $R_{43}$, $D_1$ and $D_2$, which may be the same or different, represent groups that can produce a dye that has absorption whose molecular extinction coefficient is 1,000 or over in the visible light range, with a carbonyl group or an imino group between them, and $D_1$ and $D_2$ may bond together to form a 5- to 8-membered ring. Herein, the term "visible light range" refers to a range of from 380 nm to 780 nm. $D_1$ and $D_2$ each represent an atom group that bonds, in carbon atoms of $SP^2$, $SP$ or $SP^3$ hybrid, to the carbon atom where $Z_1$ and $Z_2$ bond.

Preferably, $D_1$ and $D_2$ each represent for example an alkenyl group, an alkynyl group, an aromatic group, an aromatic heterocyclic group, an acyl group, and an iminoyl group.

The dye that is produced when the compound represented by formula (VII) and a silver(I) ion or a soluble silver complex react is preferably one represented by formula (VIII):

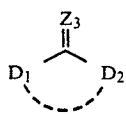

Formula (VIII)

wherein $Z_3$ represents an oxygen atom or $=N-R_{77}$, $D_1$ and $D_2$ have the same meanings as those described above, and $R_{77}$ has the same meaning as that described for $R_{43}$.

Compounds represented by formula (VIII) are those described, for example, in "The Chemistry of Synthetic Dyes," edited by K. Venkataraman, Academic Press (1970), V, 57, III, 391.

Preferable examples of the compounds represented by formula (VIII) are those represented by formulae (D-1), (D-2), (D-3), (D-4), (D-5), and (D-6):

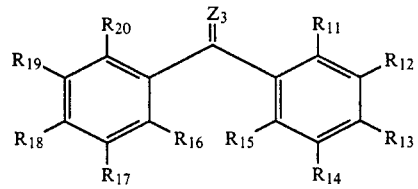 (D-1)

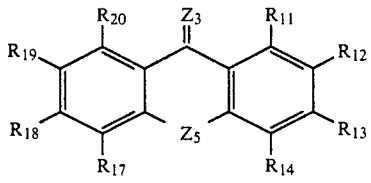 (D-2)

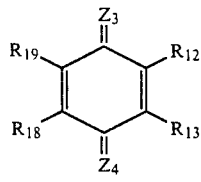 (D-3)

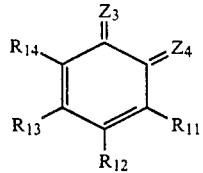 (D-4)

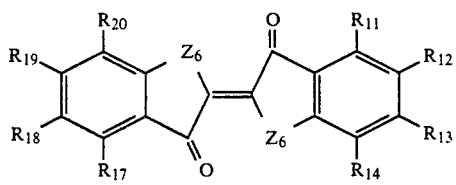 (D-5)

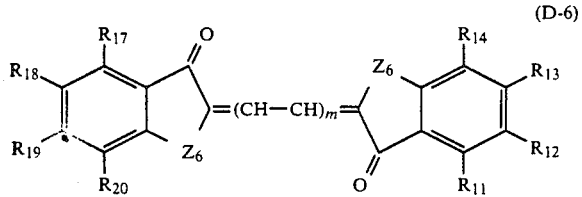 (D-6)

In formulae (D-1), (D-2), (D-3), (D-4), (D-5) and (D-6), $R_{11}$, $R_{12}$, $R_{13}$, $R_{14}$, $R_{15}$, $R_{16}$, $R_{17}$, $R_{18}$, $R_{19}$, and $R_{20}$ each represent a hydrogen atom or a monovalent substituent. Preferable monovalent substituents are ① $NH_2$, OH, $SO_3H$, $NO_2$, CN, and a halogen atom, and ② a group free from any metal atom and containing at least one carbon atom, more preferably a monovalent group having 1 to 30 carbon atoms that may contain O, N, S, or a halogen atom. Specific examples of the groups under ① and ② are a halogen atom (e.g., a fluorine atom and a chlorine atom), an alkyl group (e.g., methyl, ethyl, isopropyl, 1-butyl, t-butyl, and t-octyl), an aryl group (e.g., phenyl, p-tolyl, 4-nitrophenyl, 4-ethoxyphenyl, and 1-naphthyl), a heterocyclic group (e.g., 4-pyridyl, and 2-furyl), a hydroxyl group, an alkoxy group (e.g., methoxy, ethoxy, and 1-butoxy), an aryloxy group (e.g., phenoxy, 4-methoxyphenoxy, 4-nitrophenoxy, 3-butanesulfonamidophenoxy, 2,5-di-t-amylphenoxy, and 2-naphthoxy), a heterocyclic oxy group (e.g., 2-furyloxy), an acyloxy group (e.g., acetoxy, pivaloyloxy, benzoyloxy, and dodecanoyloxy), an alkoxycarbonyloxy group (e.g., ethoxycarbonyloxy, t-butoxycarbonyloxy, and 2-ethyl-1-hexyloxycarbonyloxy), an aryloxycarbonyloxy group (e.g., phenoxycarbonyloxy), a carbamoyloxy group (e.g., N,N-dimethylcarbamoyloxy, and N-butylcarbamoyloxy), a sulfamoyloxy group (e.g., N,N-diethylsulfamoyloxy, and N-propylsulfamoyloxy), a sulfonyloxy group (e.g., methanesulfonyloxy, and benzenesulfonyloxy), a carboxyl group, an acyl group (e.g., acetyl, pivaloyl, and benzoyl), an alkoxycarbonyl group (e.g., ethoxycarbonyl), an aryloxycarbonyl group (e.g., phenoxycarbonyl), a carbamoyl group (e.g., N,N-dibutylcarbamoyl, N-ethyl-N-octylcarbamoyl, and N-propylcarbamoyl), an amino group (e.g., amino, N-methylamino, and N,N-diocylamino), an anilino group (e.g., N-methylanilino), a heterocyclic amino group (e.g., 4-pyridylamino), an amido group (e.g., acetamido, and benzamido), a urethane group (e.g., N-hexylurethane, and N,N-dibutylurethane), a ureido group (e.g., N,N-dimethylureido, and N-phenylureido), a sulfonamido group (e.g., butanesulfonamido, and p-toluenesulfonamido), an alkylthio group (e.g., ethylthio, and octylthio), an arylthio group (e.g., phenylthio, and 4-dodecylphenylthio), a sulfinyl group (e.g., benzenesulfinyl), a sulfonyl group (e.g., methanesulfonyl, octanesulfonyl, and p-toluenesulfonyl), a sulfo group, a cyano group, and a nitro group.

Also, $R_{11}$ and $R_{12}$, $R_{12}$ and $R_{13}$, $R_{13}$ and $R_{14}$, $R_{14}$ and $R_{15}$, $R_{15}$ and $R_{16}$, $R_{16}$ and $R_{17}$, $R_{17}$ and $R_{18}$, $R_{18}$ and $R_{19}$, or $R_{19}$ and $R_{20}$ may bond together to form a 5-membered to 8-membered ring. $Z_4$ has the same meaning as that of $Z_3$. $Z_5$ represents a sulfur atom, a selenium atom,

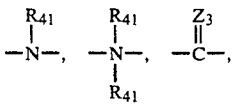

or a single bond. $Z_6$ represents an oxygen atom, a sulfur atom, or

In the compound represented by formula (D-1), at least one of the substituents represented by $R_{11}$ to $R_{20}$ is a linking group represented by formula (VI).

At least one of the substituents represented by $R_{11}$ to $R_{14}$ and $R_{17}$ to $R_{20}$ in formulae (D-2), (D-5), and (D-6) is a linking group represented by formula (VI).

At least one of the substituents represented by $R_{11}$, $R_{12}$, $R_{18}$, and $R_{19}$ in the compound represented by formula (D-3) is a linking group represented by formula (VI).

At least one of the substituents represented by $R_{11}$ to $R_{14}$ in the compound represented by formula (D-4) is a linking group represented by formula (VI).

The water-soluble group represented by Sol in the compound represented by formula (II) is preferably a carboxyl group or a sulfo group, or their salt, a hydroxyl group, or a sulfonic acid group or its salt. As the salt can be mentioned the sodium salt, the potassium salt, or the ammonium salt. Sol may bond directly to the position where any of the substituents $R_{11}$ and $R_{20}$ of the compound represented by one of formulae (D-1) to (D-6) bonds, or may bond, to one of the substituents represented by $R_{11}$ to $R_{20}$.

Specific examples of the compound represented by formula (II) are given below, but the present invention is not limited to them.

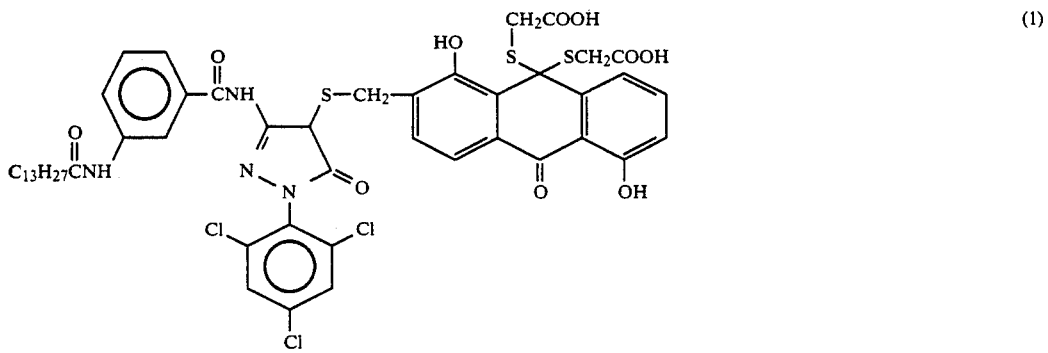

(1)

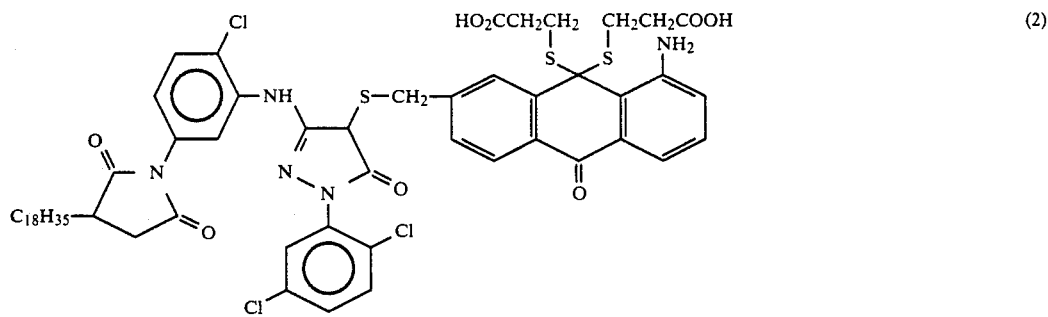

(2)

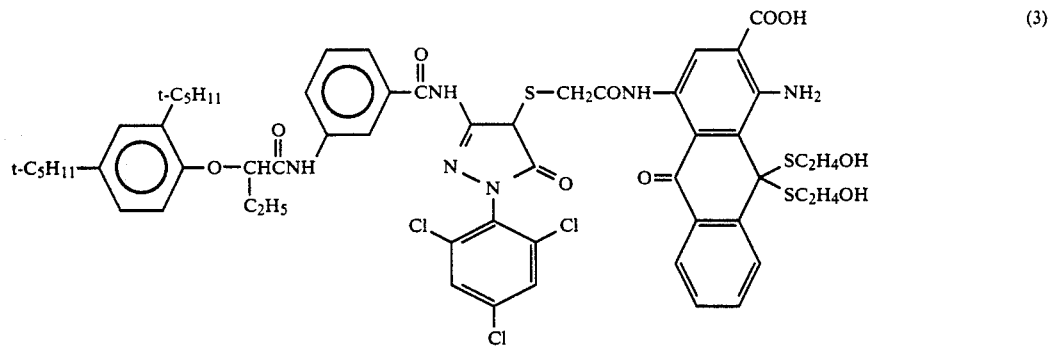

(3)

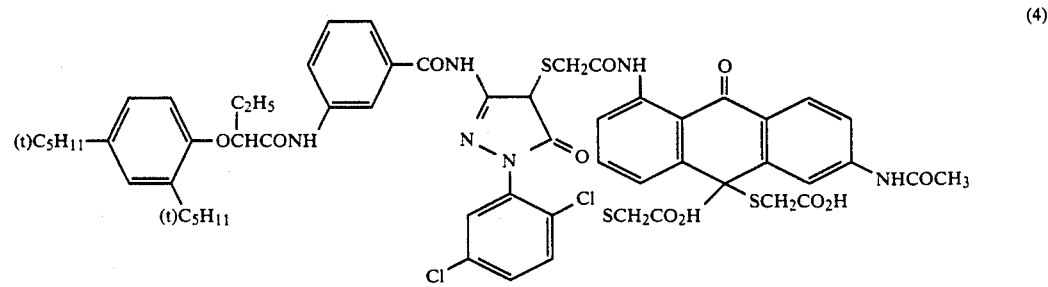

(4)

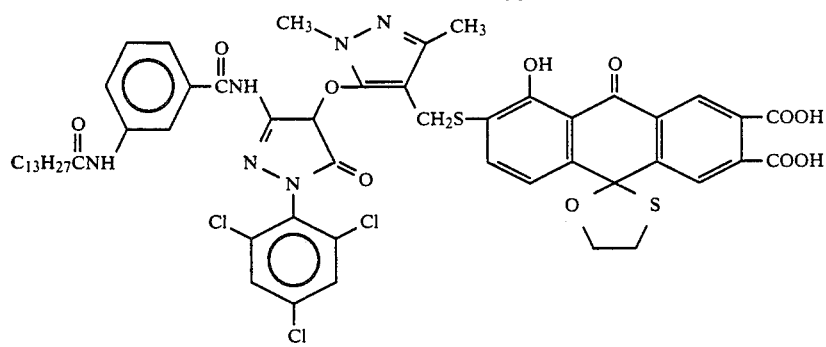
(5)
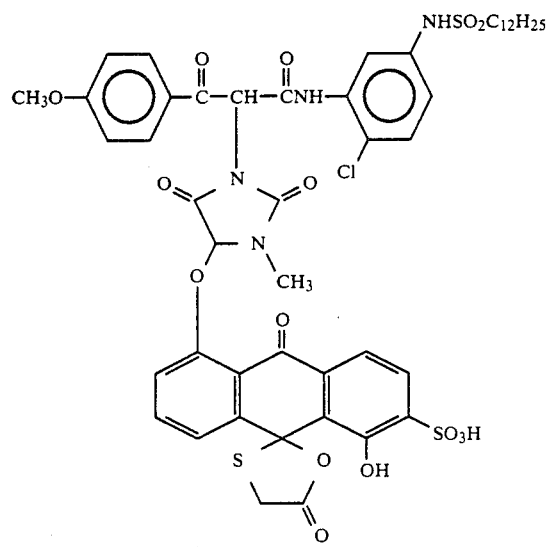
(6)
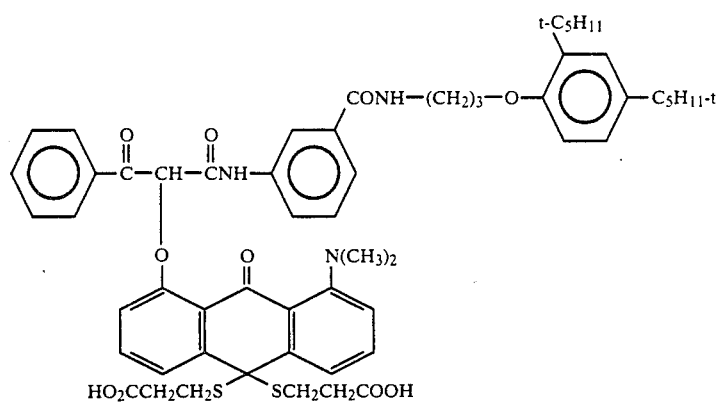
(7)
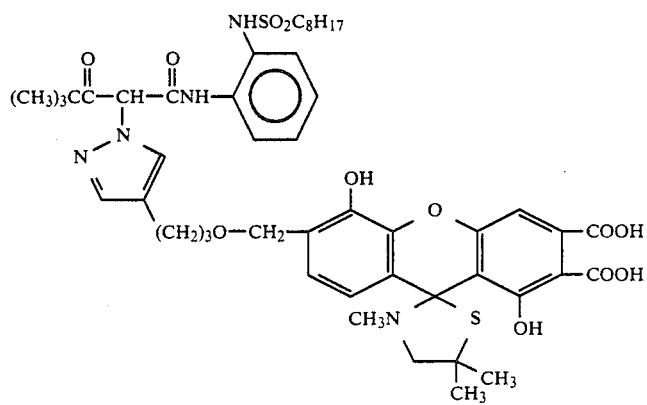
(8)

-continued
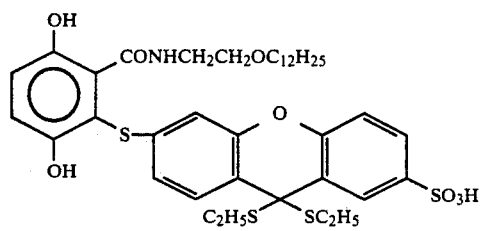
(9)
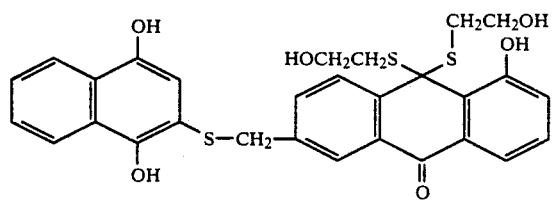
(10)
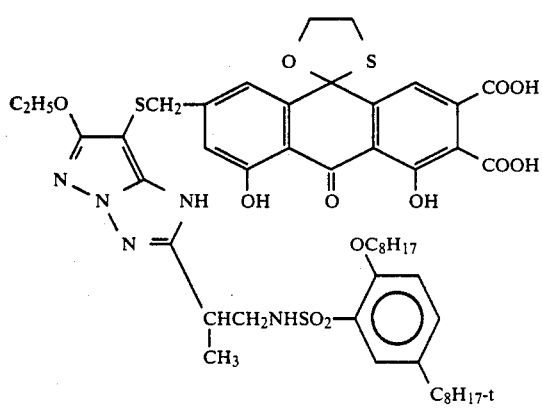
(11)
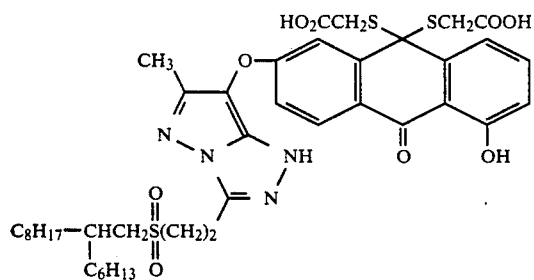
(12)
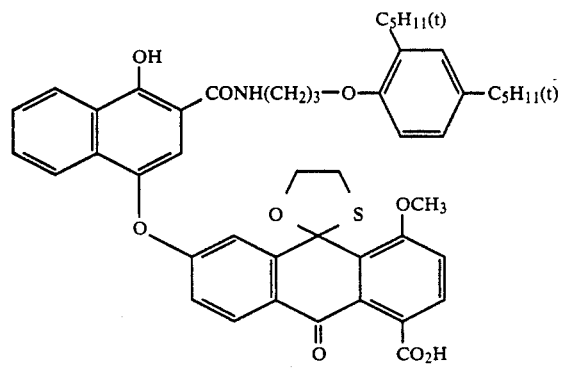
(13)

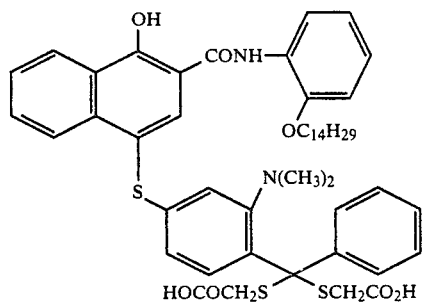
(14)
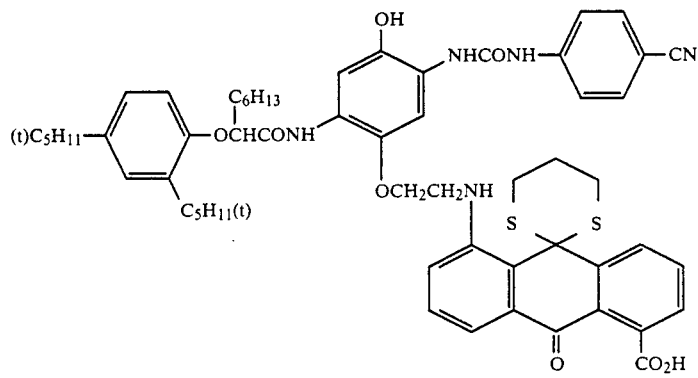
(15)
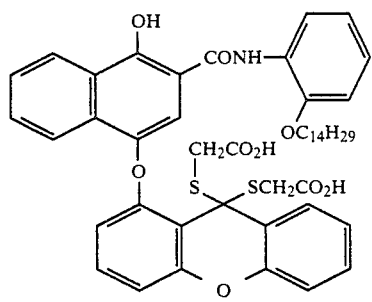
(16)
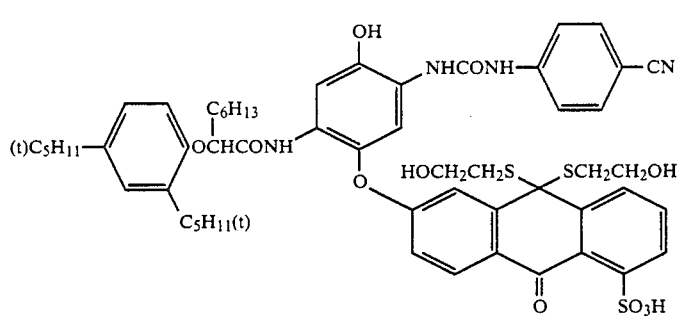
(17)
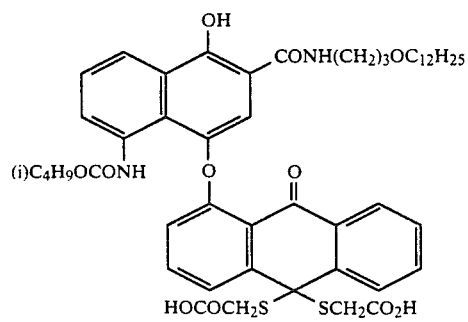
(18)

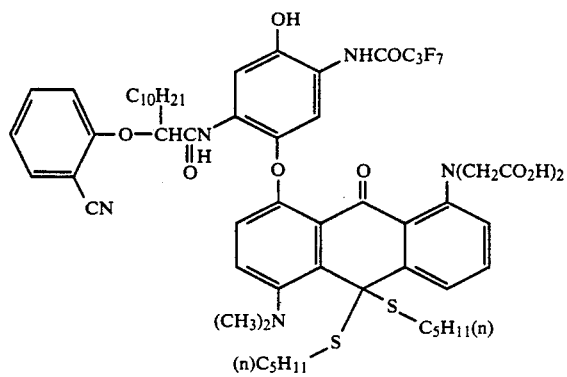
(19)
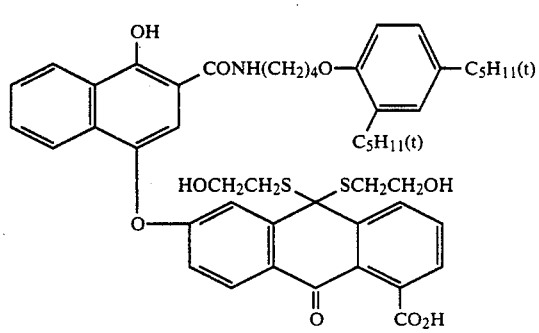
(20)
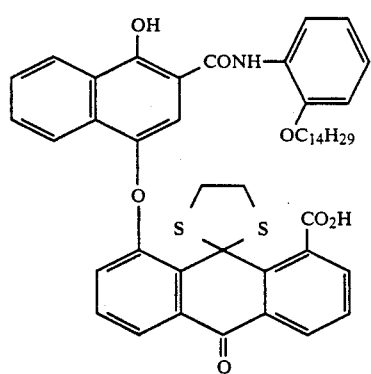
(21)
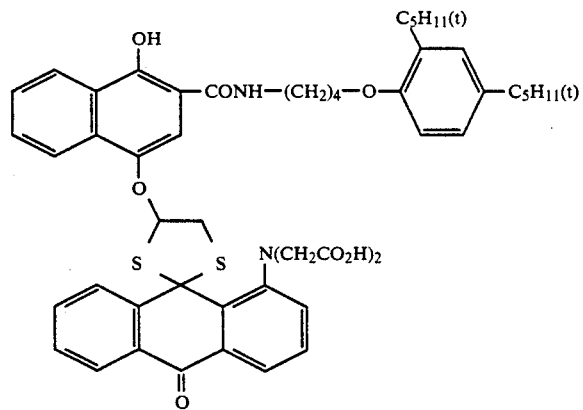
(22)

-continued
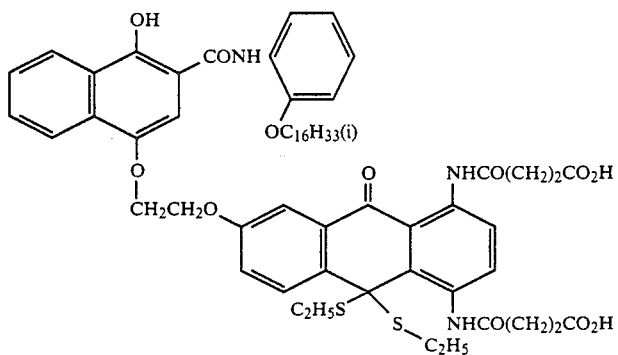
(23)
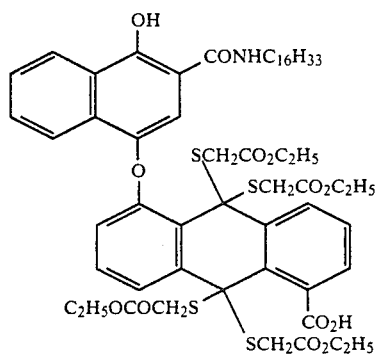
(24)
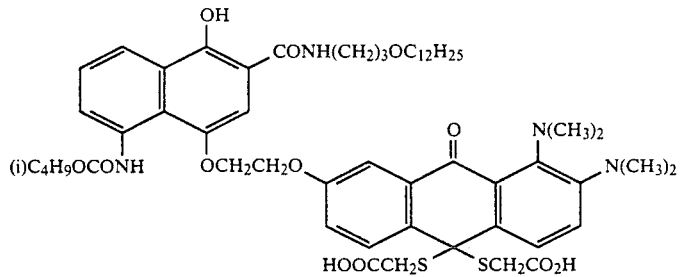
(25)
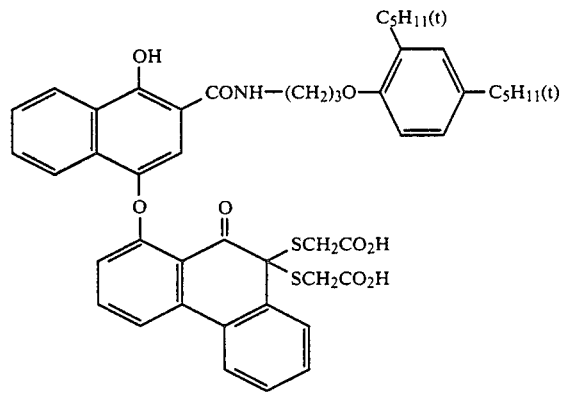
(26)

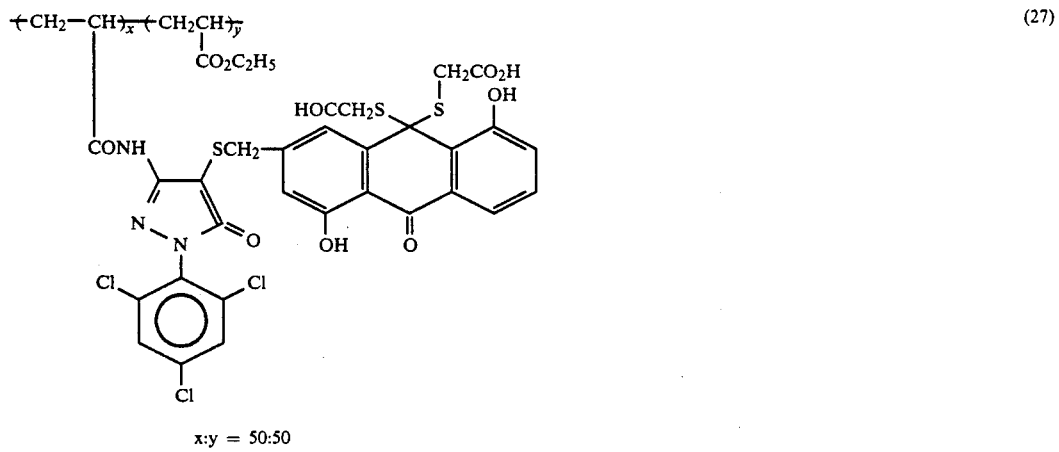
(27)
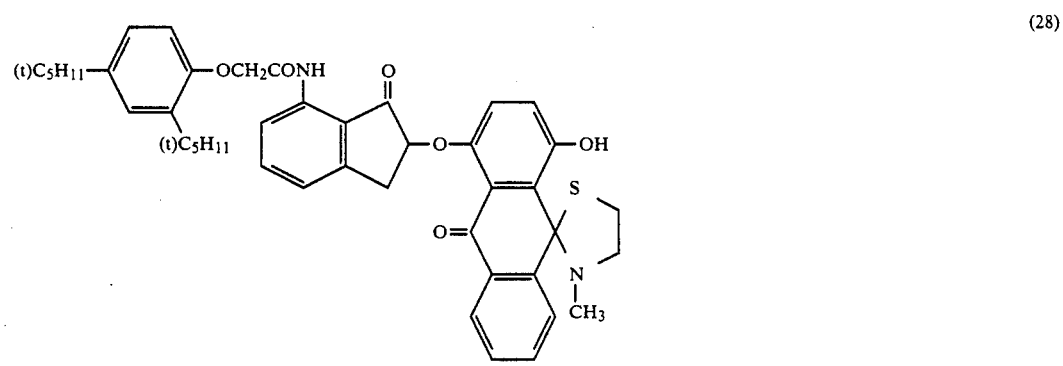
(28)
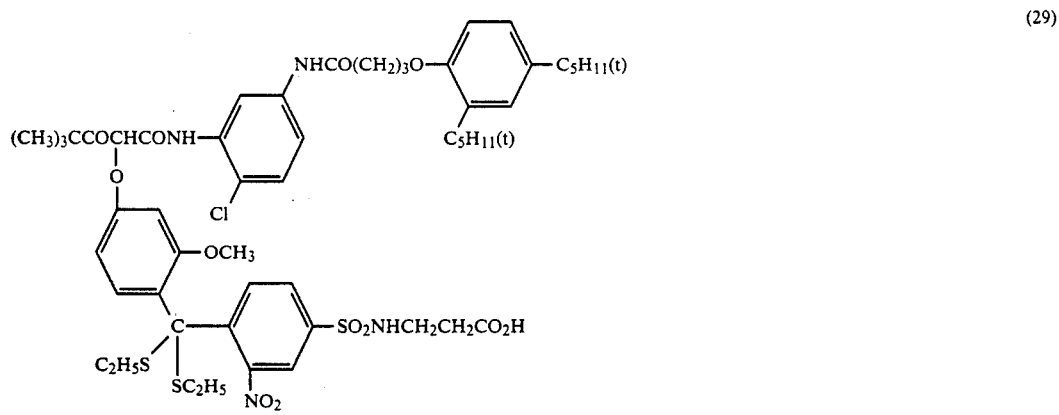
(29)
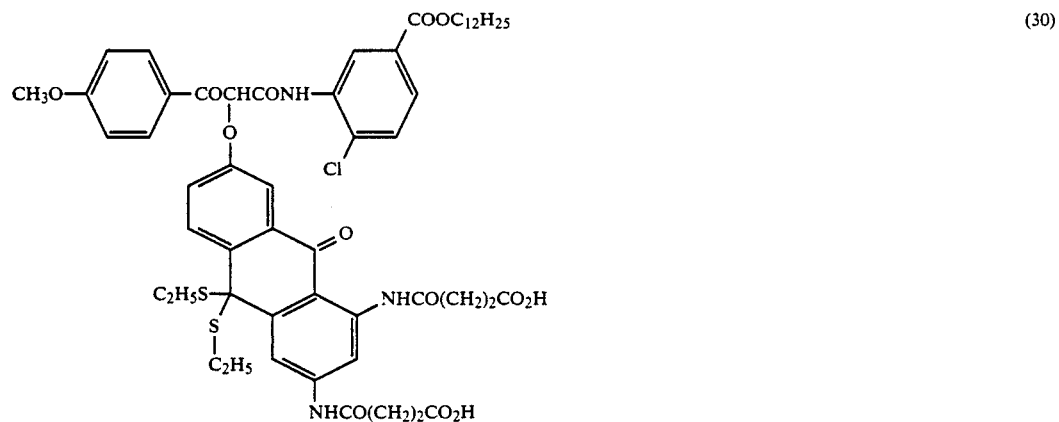
(30)

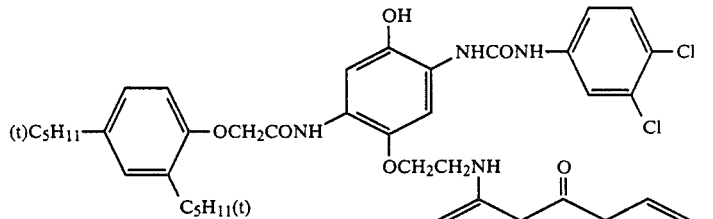

(31)

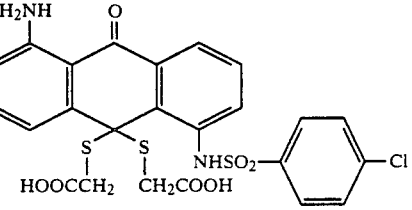

(32)

Now, methods of synthesizing the compound represented by formula (VII) will be described.

(1) The method of synthesizing from carbonyl compounds.

Carbonyl compounds can be converted easily to dithioacetals, 1,3-oxathians, or thiazolidines by the method described, for example, by Greene in Protective Group in Organic Synthesis. That is, the particular compound can be synthesized by reacting a carbonyl compound and the corresponding thiol in the presence or absence of an inorganic acid, such as hydrogen chloride, or an organic acid, such as p-toluenesulfonic acid, or a Lewis acid, such as aluminum chloride and boron trifluoride etherates.

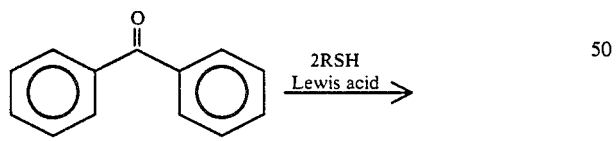

Derivatives of quinones shown below can be synthesized applying the above process.

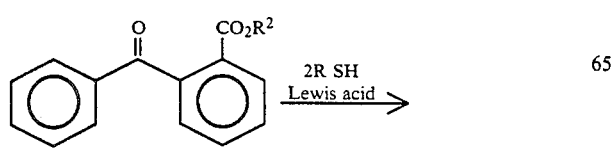

-continued

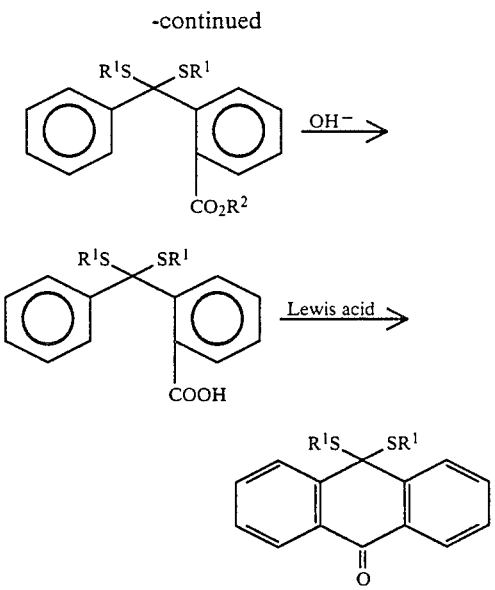

(2) The method of synthesizing from halogen compounds

-continued

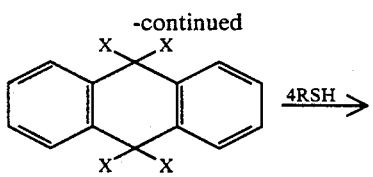

Thioacetals can be synthesized by halogenating an active methylene group followed by a reaction with a corresponding thiol compound by the process described, for example, in *J. Org. Chem*, 26, 3988 (1961) and *J. Am. Chem. Soc.*, 82, 543 (1960).

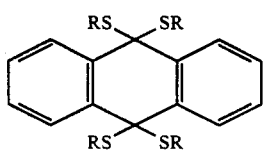

SYNTHESIS EXAMPLE (1)

Exemplified compound (4) was synthesized according to the following synthesis route:

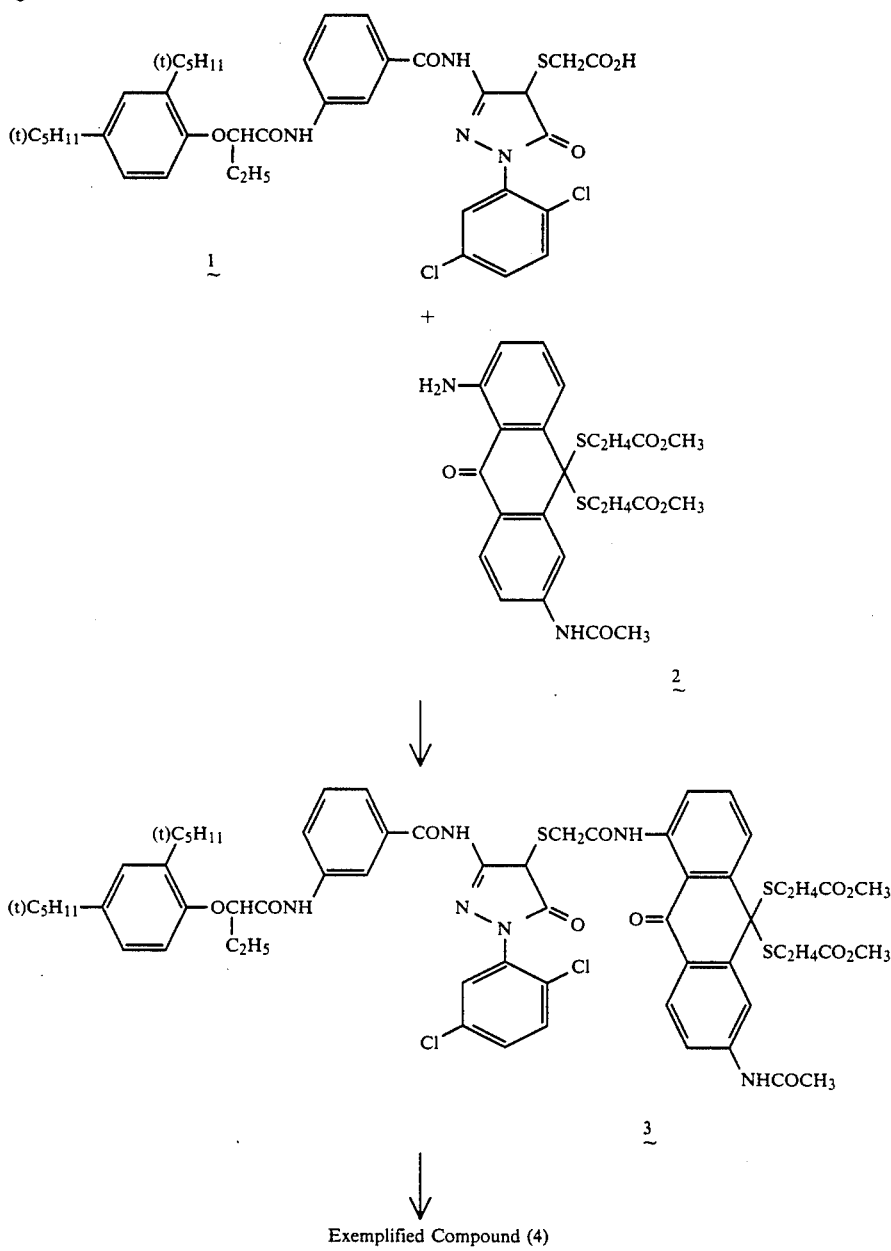

Exemplified Compound (4)

Step ①: Synthesis of the intermediate compound 3.

15.0 g of 1 (synthesized according to the process described in JP-B ("JP-B" means examined published Japanese patent publication) No. 37819/1984) and 10 g of 2 were dissolved in 200 ml of ethyl acetate. Then, 4.1 g of N,N-dicyclohexylcarbodiimide dissolved in 20 ml of ethyl acetate was added dropwise to the solution. After reacting 3 hours at room temperature (25° to 30° C.), the undissolved material was filtered off, and the filtrate was subjected to distillation by an evaporator under reduced pressure, to remove the solvent. 25.3 g of an oil 3 as a residue was obtained.

Step ②: Synthesis of the exemplified compound (4)

3 obtained above was added to 200 ml of ethanol, and 10 ml of an aqueous solution containing 3.3 g of sodium hydroxide was mixed therewith. The mixture was heated to 60° C. and stirred for 30 min. Concentrated hydrochloric acid was slowly added dropwise thereto to make it acidic, thereby depositing crystals. The crystals were filtered to give 15.2 g of the exemplified compound (4). The structure of the product was identified by the ¹H NMR spectrum and mass spectrometry.

SYNTHESIS EXAMPLE (2)

Exemplified compound (25) was synthesized according to the following synthesis route:

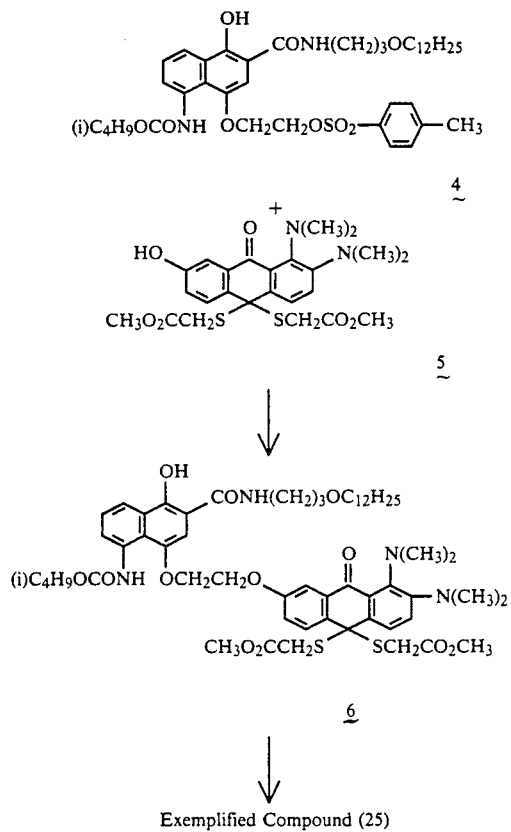

Exemplified Compound (25)

Step ①: Synthesis of the intermediate compound 6

37.1 g of 4 (synthesized according to the process described in JP-A No. 123158/1987) and 26.5 g of 5 were reacted in the presence of 5.5 g of triethylamine in 150 ml of N,N-dimethylacetamide. The reaction was effected at room temperature for 3 hours, and at 60° C. for 30 min. The reaction mixture was then added to water, and then extraction with ethyl acetate was effected. The oil layer was washed with dilute hydrochloric acid and then with water until it became neutral, and the oil layer was taken out. The solvent was distilled off, and the residue was used in the next step.

Step ②: Synthesis of the exemplified compound (25)

All of 6 obtained above was dissolved in 200 ml of N,N-dimethylformamide, and 30 ml of an aqueous solution containing 10 g of potassium hydroxide were added thereto at room temperature. After the reaction was effected at 60° C. for 30 min, it was neutralized with hydrochloric acid. Then, water and ethyl acetate were added thereto, and it was transferred to a separating funnel. The oil layer was taken out and washed with water until it became neutral. The oil layer was distilled under reduced pressure to remove the solvent. The residue was crystallized from ethyl acetate and hexane to give 13.8 g of the exemplified compound (25). The structure of the product was identified by the ¹H NMR spectrum and mass spectrometry.

The compound of the present invention can be introduced into a photographic material in various known dispersing processes.

When the oil-in-water dispersing process is employed, high-boiling solvents can be used, and examples thereof are described, for example, in U.S. Pat. No. 2,322,027. In this process, it is preferable that the compound of the present invention and a high-boiling organic solvent are emulsified together.

Specific examples of high-boiling organic solvents having a boiling point of 175° C. or over at normal pressures that are used in the oil-in-water dispersing process are a phthalate (e.g., dibutyl phthalate, dicyclohexyl phthalate, di-2-ethylhexyl phthalate, decyl phthalate, bis(2,4-di-t-amylphenyl) phthalate, bis(2,4-di-t-amylphenyl) isophthalate, and bis(1,1-diethylpropyl) phthalate), an ester of phosphoric acid or phosphonic acid (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, and di-2-ethylhexylphenyl phosphate), a benzoate (e.g., 2-ethylhexyl benzoate, dodecyl benzoate, and 2-ethylhexyl-p-hydroxy benzoate), an amide (e.g., N,N-dimethyldodecane amide, N,N-diethyllauryl amide, and N-tetradecylpyrrolidone), an alcohol or phenol (e.g., isostearyl alcohol, and 2,4-di-t-amylphenol), an aliphatic carboxylic acid ester (e.g., bis(2-ethylhexyl) sebacate, dioctyl azelate, glycerol tributylate, isostearyl lactate, and trioctyl citrate), an aniline derivative (e.g., N,N-dibutyl-2-butoxy-5-t-octylaniline), and a hydrocarbon (e.g., paraffin, dodecylbenzene, and diisopropylnaphthalene). As a co-solvent, use can be made of an organic solvent having a boiling point of about 30° C. or over, preferably having a boiling point of as low as 50° C. but as high as 160° C., and typical examples thereof are ethyl acetate, butyl acetate, ethyl propionate, methyl ethyl ketone, cyclohexanone, 2-ethoxyethyl acetate, and dimethylformamide.

The steps and effects of the latex-dispersing process, and specific examples of latices for saturation used in the process are described, for example, in U.S. Pat. No. 4,199,363 and West German Patent Application (OLS) Nos. 2,541,274 and 2,541,230.

When the compound of the present invention is soluble in alcohols, a solution of the compound in an alcohol may be added to an aqueous gelatin solution, thereby dispersing it. When the compound of the present invention is soluble in alkalis, an aqueous alkali solution thereof may be added to an aqueous gelatin solution, thereby dispersing it.

The amount of the compound of the present invention to be used is decided depending on ① the molecular extinction coefficient of the dye formed from the dye precursor, and ② the degree of the undesired absorption to be masked. Generally, the compound of the present invention is used in such an amount that the absorbance at the absorption maximum of the produced dye is in the range of 0.05 to 1.0, preferably 0.1 to 0.7.

For example, when the undesired absorption of the shorter wavelength side by a dye formed from the magenta coupler is to be corrected, a yellow forming compound of the present invention may be used in the green-sensitive emulsion layer or its adjacent layer.

When the undesired absorption of the shorter wavelength side by a dye formed from the cyan coupler is to be corrected, an yellow or a magenta forming compound of the present invention may be used in the red-sensitive emulsion layer or its adjacent layer.

And, when the undesired absorption of the longer wavelength side by a dye formed from the yellow coupler is to be corrected, a magenta forming compound of the present invention may be used in the blue-sensitive emulsion layer or its adjacent layer.

In the present photographic material, a silver halide solvent precursor described, for example, in U.S. Pat. Nos. 3,932,480, 4,382,119, 4,388,398, and 4,469,877 may be included.

The preferably silver halide contained in the photographic emulsion layer of the photographic material of the present invention is silver iodobromide, silver iodochloride, or silver iodobromochloride which contains silver iodide of 30 mol % or less. Silver iodobromide which contains silver iodide of about 2 mol % to about 25 mol % is particularly preferable.

The silver halide grains in the photographic emulsions may have a regular crystal structure such as cubic, octahedral, or tetradecanhedral, an irregular crystal such as spherical or tabular, a crystal having crystal defects such as twin planes, or a thereof composite crystal structure.

The grain size of the silver halide may be fine grains having a diameter of about 0.2 μm or less, or coarse grains with the diameter of the projected area being down to 10 μm, and a polydisperse emulsion or a monodisperse emulsion can be used.

The silver halide photographic emulsion for use in the present invention can be prepared by the process described, for example, in *Research Disclosure* (RD) No. 17643 (December, 1987), pp. 22-23, "I. Emulsion Preparation and Types"; ibid. No. 18716 (November, 1979), p. 648; P. Glafkides, *Chemie et Phisique Photographique* (Paul Montel, 1967); G. F. Duffin, *Photographic Emulsion Chemistry* (Focal Press, 1966); or V. L. Zelikman, et al., *Making and Coating Photographic Emulsion* (Focal Press, 1964).

A monodisperse emulsion described, for example, in U.S. Pat. Nos. 3,574,628 and 3,655,394, and British Patent No. 1,413,748 is also preferably.

Tabular grains having an aspect ratio of 5 or more can be used in the present invention. Tabular grains may be easily prepared by suitably using the methods described, for example, in Gutoff: *Photographic Science and Engineering*, Vol. 14, pp. 248-257 (1970): U.S. Pat. Nos. 4,434,226, 4,414,310, 4,433,048, and 4,439,520; and British Patent No. 2,112,157.

The crystal structure may be uniform, the outer halogen composition may be different from the inner halogen composition, or the crystal structure may be layered. The halide composition may be joined by the epitaxial joint to a different silver halide composition or a compound other than silver halides, for example, silver rhodanide or lead oxide, is jointed.

Further, a mixture of different crystal structures can be used.

Generally, the emulsion to be used in the present invention may be physically ripened, chemically ripened, and spectrally sensitized. Additives to be used in these steps are described in *Research Disclosure* Nos. 17643 and 18716, and the involved sections are listed in the Table below.

Known photographic additives that can be used in the present invention are also described in the above-mentioned two Research Disclosures, and the involved sections are listed in the same Table.

| | Additive | RD 17643 | RD 18716 |
|---|---|---|---|
| 1 | Chemical sensitizer | p. 23 | p. 648 (right column) |
| 2 | Sensitivity-enhancing agents | p. 23 | p. 648 (right column) |
| 3 | Spectral sensitizers, Supersensitizers | pp. 23-24 | pp. 648 (right column) -649 (right column) |
| 4 | Brightening agents | p. 24 | — |
| 5 | Antifogging agents and Stabilizers | pp. 24-25 | p. 648 (right column) |
| 6 | Light absorbers, Filter dyes and UV absorbers | pp. 25-26 | pp. 649 (right column) -650 (right column) |
| 7 | Stain-preventive agents | p. 25 (right column) | p. 650 (left to right column) |
| 8 | Image-dye stabilizers | p. 25 | — |
| 9 | Hardeners | p. 26 | p. 651 (left column) |
| 10 | Binders | p. 26 | p. 651 (left column) |
| 11 | Plasticizers and Lubricants | p. 27 | p. 650 (right column) |
| 12 | Coating aids and Surface-active agents | pp. 26-27 | p. 650 (right column) |
| 13 | Antistatic agents | p. 27 | p. 650 (right column) |

Various color couplers may be used in the present invention, and typical examples thereof are described in the patents cited in Research Disclosure (RD) No. 17643, VII-C - G.

As yellow couplers, those described, for examples, in U.S. Pat. Nos. 3,933,501, 4,022,620, 4,326,024, and 4,401,452, JP-B No. 10793/1983, and British Patent Nos. 1,425,020 and 1,476,460 may be used preferably.

As magenta couplers, the 5-pyrazolone type and pyrazoloazole type are preferably, and those described, for example, in U.S. Pat. Nos. 4,310,619 and 4,351,897, European Patent No. 73,636, U.S. Pat. Nos. 3,061,432 and 3,725,067, Research Disclosure No. 24220 (June, 1984), JP-A No. 33552/1985, Research Disclosure No. 24230 (June, 1984), JP-A No. 43659/1985, and U.S. Pat. Nos. 4,500,630 and 4,540,654 are particularly preferable.

As cyan couplers can be mentioned phenol couplers and naphthol couplers, and those described, for example, in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, West German Patent (OLS) No. 3,329,729, European Patent No. 121,362A, U.S. Pat. Nos. 3,446,622, 4,333,999, 4,451,559, and 4,427,767, and European Patent Nos. 161,626A are preferable.

As a colored coupler to rectify the unnecessary absorption of color-forming dyes, those couplers described in paragraph VII-G of Research Disclosure No. 17643, U.S. Pat. No. 4,165,670, JP-B No. 39413/1982, U.S. Pat. Nos. 4,004,929 and 4,138,258, and British Patent No. 1,146,368 are preferable.

As a coupler which forms a dye having proper diffusibility, those described in U.S. Pat. No. 4,366,237, British Patent No. 2,125,570, European Patent No. 96,570, and West German Patent Application (OLS) No. 3,234,533, are preferable.

Typical examples of a polymerized dye-forming coupler are described in U.S. Pat. Nos. 3,451,820, 4,080,211, and 4,367,282, and British Patent No. 2,102,173.

A coupler that releases a photographically useful residue can be used favorably in this invention. As a DIR coupler that releases a development retarder, those described in patents cited in paragraph VII-F of the above-mentioned Research Disclosure No. 17643, JP-A Nos. 151944/1982, 154234/1982, and 184248/1985, and U.S. Pat. No. 4,248,962 are preferable.

As a coupler which releases, imagewise, a nucleating agent or a development accelerator upon developing, those described in British Patent Nos. 2,097,140 and 2,131,188, and JP-A Nos. 157638/1984 and 170840/1984 are preferable.

Other couplers that can be incorporated in the photographic material of the present invention include competitive couplers described in U.S. Pat. No. 4,130,427, multiequivalent couplers described in U.S. Pat. Nos. 4,283,472, 4,338,393, and 4,310,618, couplers that release a DIR coupler redox compound or a DIR coupler, as described, for example, in JP-A Nos. 185950/1985 and 24252/1987, couplers that release a dye to regain a color after releasing, as described in European Patent No. 173,302A, couplers that release a bleach-accelerator, as described in R.D. Nos. 11449 and JP-A No. 201247/1066, and couplers that release a ligand, as described in U.S. Pat. No. 4,553,477.

The present invention can be applied to various color photographic materials. Examples that may be mentioned include color negative film for general use or movie, color reversal film for slide or television, color paper, color positive film, and color reversal paper.

Suitable substrates that can be used in the present invention are described, for example, on p. 28 of the above-mentioned R.D. No. 17643, and on the right column of p. 627 to the left column of p. 648 in ibid. No. 18716.

The color photographic material according to the present invention can be subjected to development processing as described in pp. 28-29 of the above-mentioned R.D. No. 17643, and on the left to right columns of p. 651 in ibid. No. 18716.

The color-developing solution to be used in the developing process of the photographic material of the present invention is preferably an aqueous alkaline solution whose major component is an aromatic primary amine-type color developing agent. As the color developing agent, aminophenol-type compounds are useful, and p-phenylenediamine-type compounds are preferably used, typical examples thereof being 3-methyl-4-amino-N,N-diethlaniline, 3-methyl-4-amino-N-ethyl-N-β-hydroxylaniline, 3-methyl-4-amino-N-ethyl-N-β-methanesulfonamidoethylaniline, and 3-methyl-4-amino-N-ethyl-N-β-methoxyethylaniline and their sulfates, and hydrochlorides or p-toluenesulfonates. These compounds may be used in combination according to the purpose.

Generally the color-developing solution contains pH buffers such as carbonates, borates, or phosphates of alkali metals; antifoggants or development retarders, such as mercapto compounds, benzothiazoles, benzimidazoles, iodides or bromides; and if required, preservatives such as hydroxylamine, diethylhydroxylamine, sulfites, hydrazines, phenylsemicarbazides, triethanolamine, catecholsulfonic acids, and triethylenediamine(1,4-diazabicyclo[2,2,2]octane); organic solvents such as ethylene glycol and diethylene glycol; development accelerators such as benzyl alcohol, polyethylene glycol, quaternary ammonium salts, and amines; dye-forming couplers; competing couplers; fogging agents such as sodium boron hydride; auxiliary developing agents such as 1-phenyl-3-pyrazolidone; thickening agents; and chelate agents, such as aminopolycarboxylic acids, aminopolyphosphonic acids alkylphosphonic acids, and phosphonocarboxylic acids such as, for example, etylenediaminetetraacetic acid, nitrilotriacetic acid, diethylenetriaminetetraacetic acid, cyclohoxanediaminetetraacetic acid, hydroxythlimidinoacetic acid, 1-hydroxyethylidene-1,1-diphosphonic acid, nitrilo-N,N,N-trimethylenephosphonic acid, ethylenediamine-N,N,N',N'-tetramethylenephosphonic acid, and ethylenediamine-di-(o-hydroxyphenylacetic acid), and their salts.

For reversal processing a color development is generally carried out after a black-and-white development. For the black-and-white developing solution, known black-and-white-developing agents such as dihydroxybenzenes (e.g., hydroquinone), 3-pyrazolidones (e.g., 1-phenyl-3-pyrazolidone), and aminophenols (e.g., N-methyl-p-aminophenol) may be used alone or in combination with others.

Generally the color-developing solution has a pH of 9 to 12. Although the replenishing amount of the developing solution varies depending on the color photographic material to be processed, generally the replenishing amount is 3 l or below per m$^2$ of the photographic material, and the replenishing amount can be lowered to 500 ml or below if the bromide ion concentration of the replenishing solution is lowered. If it is required to lower the replenishing amount, it is preferable that the area of the processing tank in contact with air is minimized to prevent the solution from evaporating or being oxidized by air. The replenishing amount can also be lowered by suppressing the accumulation of bromide ions in the developing solution.

The photographic emulsion layers are generally subjected to a bleaching process after color development.

The bleaching process can be carried out together with the fixing process (bleach-fixing process), or it can be carried out separately from the fixing process. Further, to quicken the process, bleach-fixing may be carried out after the bleaching process. In accordance with the purpose, the process may be arbitrarily carried out using a bleach-fixing bath having two successive tanks, or a fixing process may be carried out before the bleach-fixing process, or a bleaching process may be carried out after the bleach-fixing process. As the bleaching agent, use can be made of, for example, compounds of polyvalent metals, such as iron (III), cobalt (III), chromium (VI), and copper (II), peracids, quinones, and nitro compounds. As typical bleaching agents, use can be made of ferricyanides; dichromates; organic complex salts of iron (II) or cobalt (III), such as complex salts of aminopolycarboxylic acids, for example ethylenediaminetetraacetic acid, diethylenetriaminetetraacetic acid, cyclohexadiaminetetraacetic acid, methyliminodiacetic acid, 1,3-diaminopropinacetic acid, and glycol ether diamine tetraacetic acid, citric acid, tartaric acid, and malic acid; persulfates; bromates; permanganates; and nitrobenzenes. Of these, aminopolycarboxylic acid iron (III) complex salts, including ethylenediaminetetraacetic acid iron (III) complex salts, including ethylenediaminetetraacetic acid iron (III) complex salt, and persulfates are preferable in view of rapid processing and the prevention of environmental pollution. Further, aminopolycarboxylic acid iron (III) complex salts are particularly useful in a bleaching solution as well as a bleach-fix solution. The pH of the bleaching solution or the bleach-fix solution using these aminopolycarboxylic acid iron (III) complex salts is generally 5.5 to 8, but if it is required to quicken the process, the process can be effected at a lower pH.

In the bleaching solution, the bleach-fix solution, and the baths preceding them a bleach-accelerating solution may be used if necessary. Examples of useful bleach-accelerating agents are compounds having a mercapto group or a disulfide linkage, described in U.S. Pat. No. 3,893,856, West German Patent Nos. 1,290,812 and 2,059,988, JP-A Nos. 32736/1978, 57831/1978, 37418/1978, 72623/1978, 95630/1978, 95631/1978, 104322/1978, 124424/1978 141623/1978, and 28426/1978, and Research Disclosure No. 17129 (July. 1978); thiazolidine derivatives, described in U.S. Pat. No. 3,706,561; thiourea derivatives, described in JP-B No. 8506/1970, JP-A Nos. 20832/1977 and 32735/1978, and U.S. Pat. No. 3,706,561; iodide salts, described in West German Patent No. 1,127,715 and JP-A No. 16235/1983; polyoxyethylene compounds, described in West German Patent Nos. 966,410 and 2,748,430; polyamine compounds, described in JP-B No. 8836/1970; other compounds, described in JP-A Nos. 42434/1974, 59644/1978, 35727/1979, 26505/1080, and 163940/1983; and bromide ions. Of these, compounds having a mercapto group or a disulfide group are preferable in view of higher acceleration effect, and in particular, compounds described in U.S. Pat. No. 3,893,858, West German Patent No. 1,290,812, and JP-A No. 95630/1978 are preferable. Compounds described in U.S. Pat. No. 4,552,834 are preferable. These bleach-accelerating agents may be added into the photographic material. When the color photographic materials for photographing are to be bleach-fixed, these bleach-accelerating agents are particularly effective.

As a fixing agent can be mentioned thiosulfates, thiocyanates, thioether-type compounds, thioureas, and large amounts of iodide salts. Although thiosulfate may be used in order to accelerate the conversion to dye of the masking compounds represented by formula(I) or (II) of the present invention, compounds such as thioether compounds and thiourea compounds which have lower stability constant of the complex-formation with silver ion than thiosulfate are preferably used. Examples of preferable fixing agent may be mention are as follows:

(CH$_3$)$_2$N(CH$_2$)$_2$S(CH$_2$)$_2$S(CH$_2$)$_2$N(CH$_3$)$_2$
HO(CH$_2$)$_2$S(CH$_2$)$_2$S(CH$_2$)$_2$OH

HOOCCH$_2$S(CH$_2$)$_2$SCH$_2$COOH

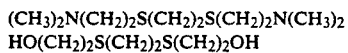

CH$_3$SCH$_2$CHCOOH
|
NH$_2$

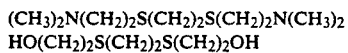

(CH$_3$)$_2$NCN(CH$_3$)$_2$

-continued

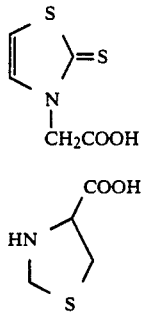

The fixing process of the silver halide photographic material of the present invention may be carried out by using two or more successive baths that are different in fixing ability, in order to quicken the color formation of the masking compound of the present invention represented by formula (I) or (II), and to facilitate the desilvering. In this case, it is preferable that the first processing bath contain a fixing agent mentioned above as a preferable fixing agent, and that other subsequent baths contain a fixing agent high in fixing ability, such as a thiocyanate or a thiosulfate. The processing solutions having respective fixing abilities may contain a combination of two or more fixing agents. As a preservative for the bleach-fix solution and the fixing solution, it is preferable to use a sulfite, a bisulfite, or a carbonyl bisulfite adduct.

The silver halide photographic material of the present invention may be processed with a processing solution containing silver(I) ions or a soluble silver complex after the color development process. As the processing solution containing silver(I) ions or a soluble silver complex can be mentioned a solution comprising an aqueous solution containing a silver(I) salt, such as silver nitrate, and silver perchlorate, or an aqueous silver solvent solution in which silver chloride, silver bromide, or silver iodide has been dissolved. In this case, as the silver solvent that can be used can be mentioned a thiosulfate, a thiocyanate, or one mentioned above as a preferable fixing agent. The concentration of silver(I) ions or the soluble silver complex is $1.0 \times 10^{-4}$ to 2.0 mol/l, preferably $1.0 \times 10^{-3}$ to $5 \times 10^{-1}$ mol/l.

It is common for the silver halide color photographic material of the present invention to undergo, after a desilvering process such as fixing or bleach-fix, a washing step and/or a stabilizing step. The amount of washing water may be set within a wide range depending on the characteristics (e.g., due to the materials used, such as couplers), the application of the photographic material, the washing temperature, the number of washing tanks (the number of steps), the type of replenishing system, including, for example, the counter-current system and the direct flow system, and other various conditions. Of these, the relationship between the number of water-washing tanks and the amount of washing water in the multi-stage counter-current system can be found according to the method described in *Journal of Society of Motion Picture and Television Engineers*, Vol. 64, pages 248 to 243 (May 1955).

According to the multi-stage-counter-current system described in the literature mentioned above, although the amount of washing water can be considerably reduced, bacteria propagate with an increase of retention time of the washing water in the tanks, leading to a problem with the resulting suspended matter adhering to the photographic material. In processing the present color photographic material, as a measure to solve this problem, the method of reducing calcium and magnesium described in JP-A No. 288838/1987 can be used quite effectively. Also chlorine-type bactericides such as sodium chlorinated isocyanurate, cyabendazoles, isothiazolone compounds described in JP-A No. 8542/1982, benzotriazoles, and other bactericides described by Hiroshio Horiguchi in "*Bokin/bobaizai no Kagaku,*" edited by Eiseigijutsu-kai, and in "*Bokin Bivaizai Jiten*", edited by Nihon Bokin Bobai-Gakkai, can be used.

The pH of the washing water used in processing the present photographic material is 4 to 9, preferably 5 to 8. The wahing water temperature and the washing time to be set may vary depending, for example, on the characteristics and the application of the photographic material, and they are generally selected in the range of 15° to 45° C. for 20 sec. to 10 min., and preferably in the range of 25° to 40° C. for 30 sec. to 5 min. Further, the photographic material of the present invention can be processed directly with a stabilizing solution instead of the above washing. In such a stabilizing process, any of known processes, for example, a multi-step counter-current stabilizing process or its low-replenishing-amount process, described in JP-A Nos. 8543/1982, 14834/1983, and 220345/1985.

In some cases, the above washing process is further followed by a stabilizing process, and as an example thereof can be mentioned a stabilizing bath that is used as a final bath for color photographic materials for photography, which contains formalin and a surface-active agent. In this stabilizing bath, each kind of the chelating agents and bactericides may be added.

The over-flowed solution due to the replenishing of washing solution and/or stabilizing solution may be reused in other steps, such as a desilvering step.

The silver halide color photographic material of the present invention may contain therein a color-developing agent for the purpose of simplifying and quickening the process. To contain such a color-developing agent, it is preferable to use a precursor for a color-developing agent. For example, indoaniline-type compounds described in U.S. Pat. No. 3,342,597, Schiff base-type compounds described in U.S. Pat. No. 3,342,599 and Research Disclosure Nos. 14850 and 15159, aldol compounds described in Research Disclosure No. 13924, metal salt complexes described in U.S. Pat. No. 3,719,492, and urethane-type compounds described in JP-A No. 135628/1978 can be mentioned.

For the purpose of accelerating the color development, the present silver halide color photographic material may contain, if necessary, various 1-phenyl-3-pyrazolidones. Typical compounds are described in JP-A No. 64339/1981, 144547/1982, and 115438/1983.

The various processing solutions used for the present invention are used at 10° to 50° C. Although generally a temperature of 33° to 38° C. is standard, a higher temperature can be used to accelerate the process to reduce the processing time, or a lower temperature can be used to improve the image quality or the stability of the processing solutions. Also, to save the silver of the photographic material, a process using hydrogen peroxide intensification or cobalt intensification described in West German Patent No. 2,226,770 and U.S. Pat. No. 3,674,499 may be carried out.

The photographic material of the present invention can be applied to the heat development-type photographic material as described in U.S. Pat. No. 4,500,626, JP-A Nos. 133449/1985 and 218443/1984, and European Patent No. 210,660A2.

Since the silver halide photographic material of the present invention contains, in at least one silver halide emulsion layer on the base, a compound that is colorless or has a substantially harmless color at the time of the exposure, and which can produce a dye when developed that has a hue suitable for color masking, the lowering of sensitivity due to color-correction can be prevented effectively. According to the present invention even if the silver halide photographic material of the present invention is a multilayer photographic material having a blue-sensitive layer, a green-sensitive layer, and a red-sensitive layer, such an excellent effect can be exhibited that there is no risk that lowering of the sensitivity of a lower layer due to color masking will occur. Further, the present silver halide photographic material can be used in an image-forming process, wherein it is used with a negative emulsion or a positive emulsion to form a positive image or a negative image.

The compound A-B represented by formula (I) of the present invention is converted after the color development into a dye that has absorption in the visible light range by silver (I) ions or a soluble silver complex present uniformly in the bleaching solution or the bleach-fixing solution.

The present invention will now be described with reference to Examples, but the present invention is not limited to them.

The name or formula of the compounds used in this Example are as follows:

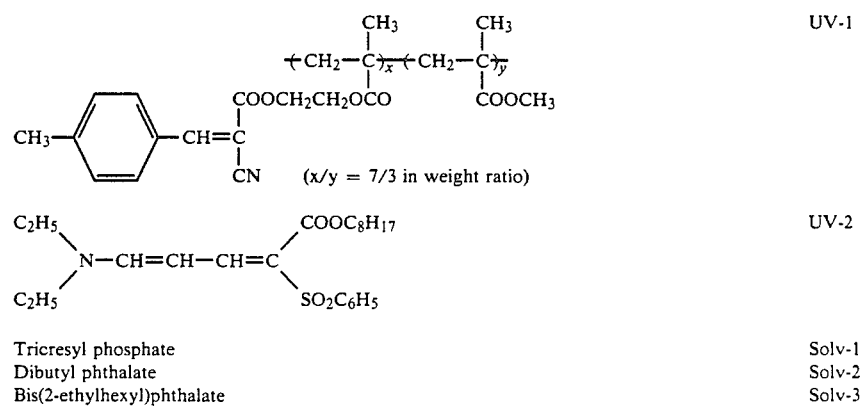

| | |
|---|---|
| Tricresyl phosphate | Solv-1 |
| Dibutyl phthalate | Solv-2 |
| Bis(2-ethylhexyl)phthalate | Solv-3 |

ExM-8
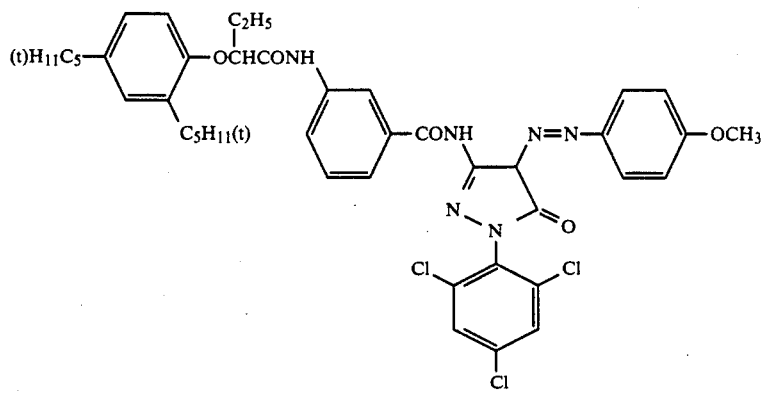
ExF-1
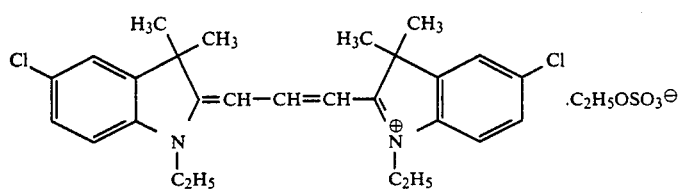
ExC-2
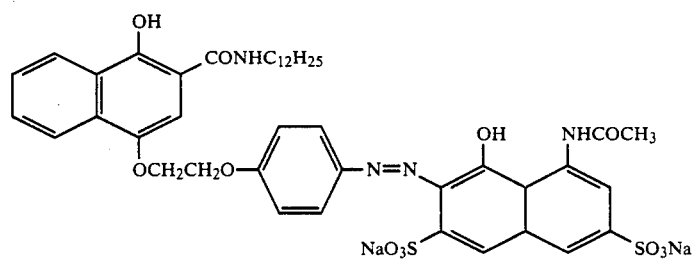
ExC-3
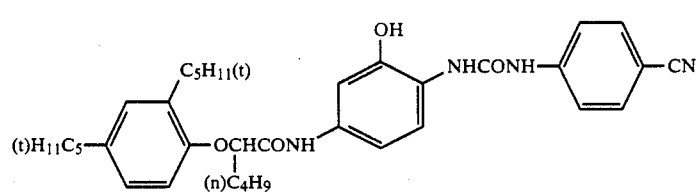
ExC-4
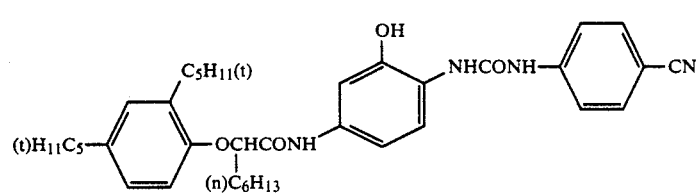
ExC-6
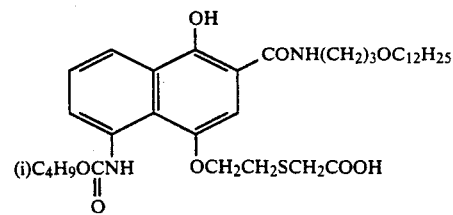

-continued
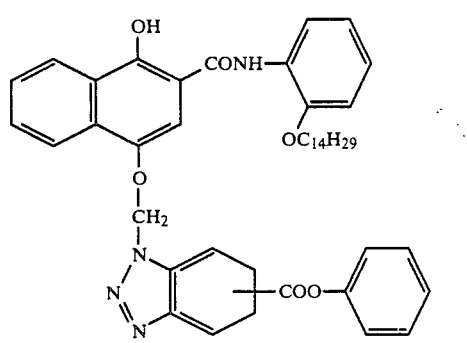
ExC-7
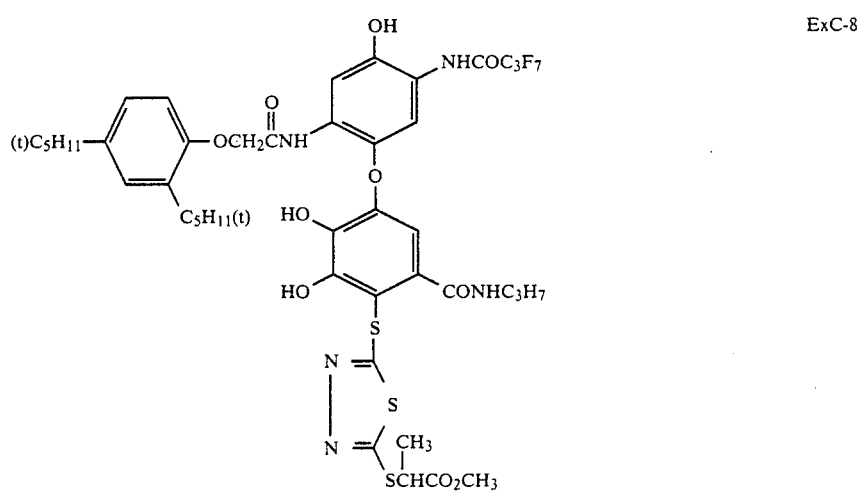
ExC-8
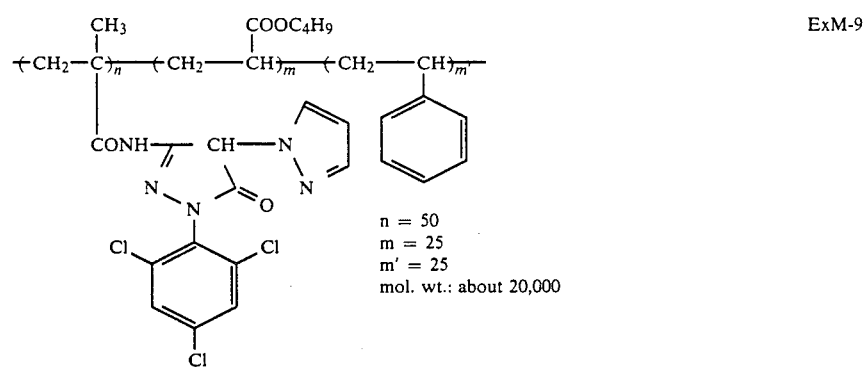
ExM-9
n = 50
m = 25
m' = 25
mol. wt.: about 20,000
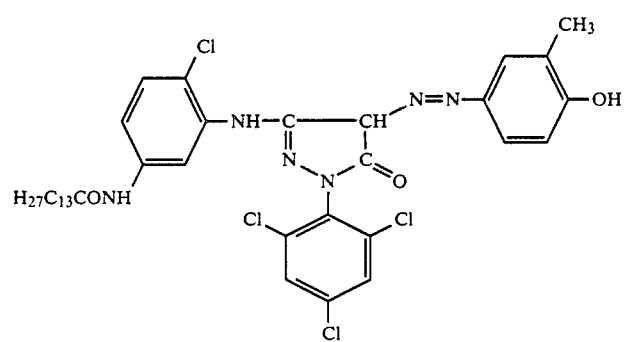
ExM-10

-continued
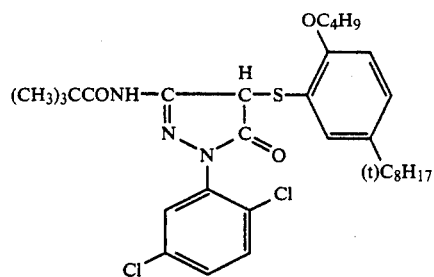
ExM-11
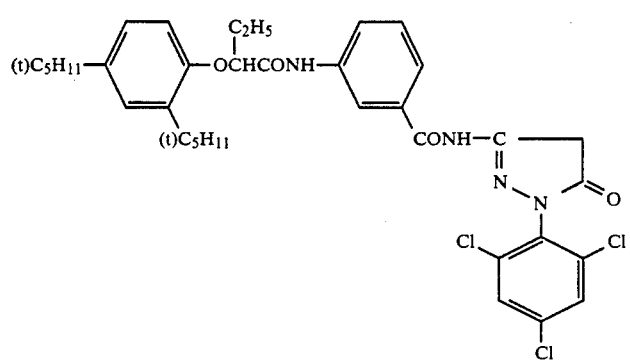
ExM-12
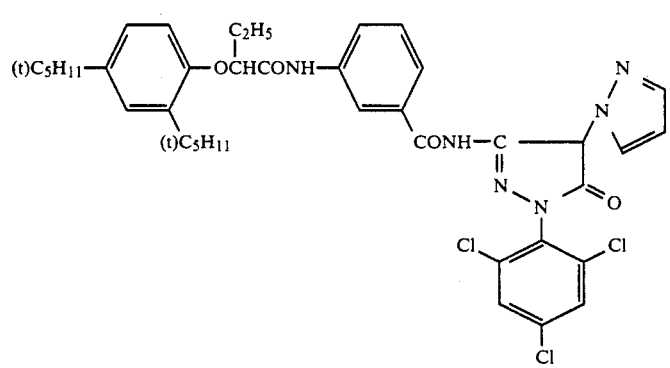
ExM-13
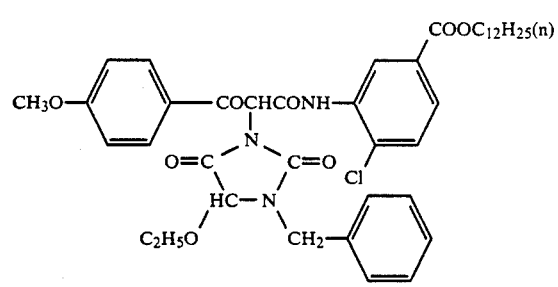
ExY-16
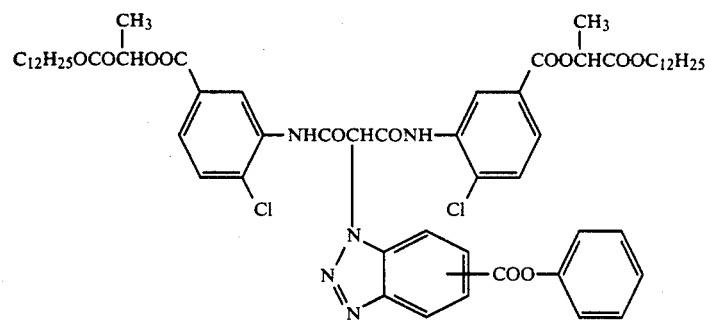
ExY-14

-continued
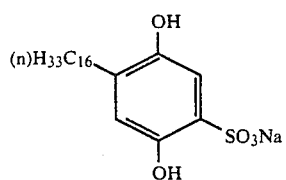  Cpd-1
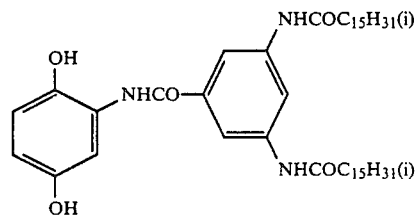  Cpd-2
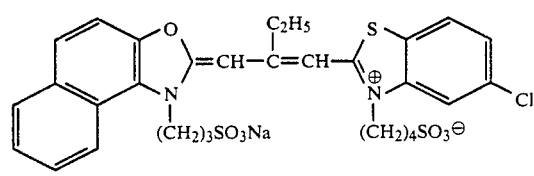  ExS-1
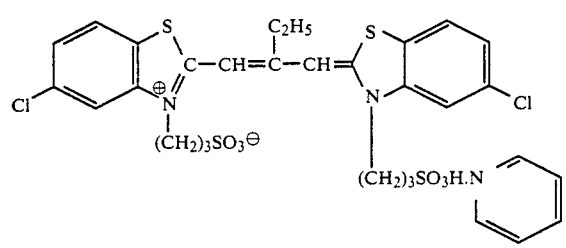  ExS-2
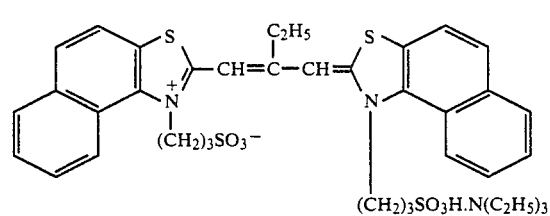  ExS-3
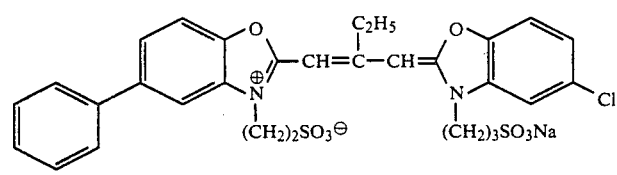  ExS-4
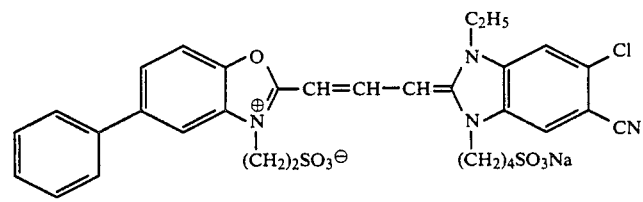  ExS-5
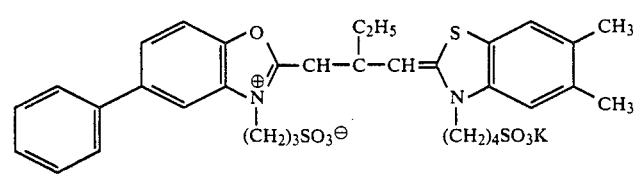  ExS-6

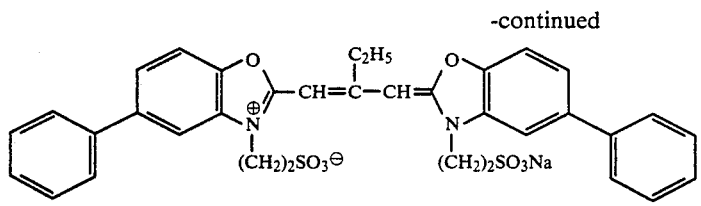 ExS-7

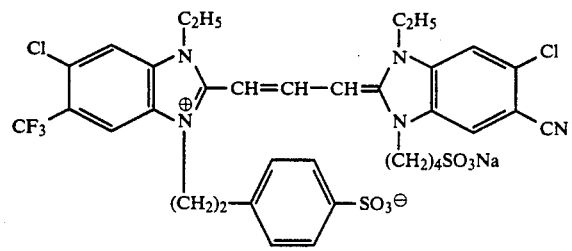 ExS-8

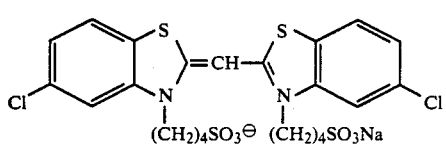 ExS-9

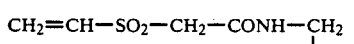
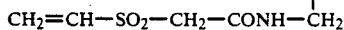 H-1

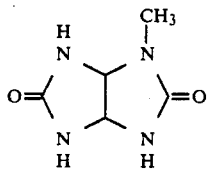 Cpd-3

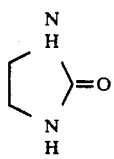 Cpd-4

EXAMPLE 1

A photosensitive material (Sample 101) consisting of layers of the following composition was prepared on an undercoated triacetate cellulose film base.

Composition of Photosensitive Layers

In the following compositions, the coating amount of silver halide is indicated in g/m² in terms of silver, the coating amount of the coupler, additive, and gelatin are each indicated in g/m².

| First layer (emulsion layer) | |
|---|---|
| Silver iodobromide emulsion (silver iodide: 5 mol %) | 3.8 |
| ExM-13 (coupler) | 0.78 |
| Solv-1 (solvent for the coupler) | 0.78 |
| Gelatin | 1.6 |
| Second layer (Protective layer) | |
| Gelatin | 0.45 |
| Poly(methyl methacrylate) particles (diameter: about 1.5 μm) | 0.2 |

The gelatin hardener H-1 and a surface-active agent were added to each layer.

Preparation of Samples 102 to 106

Samples 102 to 106 were prepared by repeating the same procedure as Sample 1, except that ExM-13 was respectively changed at equal mol to the exemplified compound (1), (2), (4), (11), and (12).

Each of these Samples 101 to 106 was subjected to an wedge exposure of 20 CMS of white light and then to development processing according to the processing process (I) shown below. B-densities of the parts having G-densities of 0.5, 1.0, and 2.0, and of the unexposed part were determined. The results are shown in Table 1.

TABLE 1

| | | B-Density | | | |
|---|---|---|---|---|---|
| Sample | Coupler | unexposed | $D_G = 0.5$ | $D_G = 1.0$ | $D_G = 2.0$ |
| 101 (comparative example) | ExM-13 | 0.0 | 0.09 | 0.19 | 0.39 |
| 102 (this invention) | (1) | 0.48 | 0.49 | 0.51 | 0.56 |
| 103 (this invention) | (2) | 0.39 | 0.43 | 0.46 | 0.57 |
| 104 (this | (4) | 0.51 | 0.52 | 0.54 | 0.57 |

TABLE 1-continued

| | | B-Density | | | |
|---|---|---|---|---|---|
| Sample | Coupler | unexposed | $D_G = 0.5$ | $D_G = 1.0$ | $D_G = 2.0$ |
| 105 (this invention) | (11) | 0.38 | 0.37 | 0.35 | 0.33 |
| 106 (this invention) | (12) | 0.24 | 0.25 | 0.26 | 0.28 |

Note
$D_G$ = G-density

From the results in Table 1 it is evident that although the yellow density of the comparative example coated only with usual magenta coupler increases in proportion to increase of magenta density, the change of yellow densities corresponding to the change of magenta densities of samples on which the compound of the present invention were coated are small. These results show that a yellow dye is formed reversal image-wise to magenta color image in the present invention and that the compound of the present invention is useful for color masking.

| | Processing process (I) | |
|---|---|---|
| Step | Time | Temperature |
| Color developing | 3 min. 15 sec. | 38° C. |
| Bleaching | 6 min. 30 sec. | 38° C. |
| Silver ion bath | 3 min. 00 sec. | 38° C. |
| Fixing | 4 min. 20 sec. | 38° C. |
| Water washing (1) | 1 min. 05 sec. | 24° C. |
| Water washing (2) | 2 min. 10 sec. | 24° C. |
| Stabilizing | 1 min. 05 sec. | 38° C. |
| Drying | 4 min. 20 sec. | 55° C. |

The composition of each processing solution was as follows:

| | (g) |
|---|---|
| Color-developing solution | |
| Diethylenetriaminetetraacetate | 1.0 |
| 1-Hydroxyethylidene-1, 1-diphosphate | 3.0 |
| Sodium sulfite | 4.0 |
| Potassium carbonate | 30.0 |
| Potassium bromide | 1.4 |
| Potassium iodide | 15 mg |
| Hydroxylamine sulfate | 2.4 |
| 4-(N-Ethyl-N-β-hydroxyethylamino)-2-methylaniline sulfonate | 4.5 |
| Water to make | 1000 ml |
| pH | 10.05 |
| Bleaching solution | |
| Iron (III) sodium ethylenediamine-tetraacetate trihydrate | 100.0 |
| Disodium ethylenediamine-tetraacetate | 10.0 |
| Ammonium bromide | 140.0 |
| Ammonium nitrate | 30.0 |
| Aqueous ammonia (27%) | 6.5 ml |
| Water to make | 1000 ml |
| pH | 6.0 |
| Silver ion bath | |
| Silver perchlorate | 2.1 |
| Sodium acetate | 4.2 |
| Water to make | 1000 ml |
| Fixing solution | |
| Disodium ethylenediamine-tetraacetate | 0.5 |
| Sodium sulfite | 7.0 |
| Sodium hydrogensulfite | 5.0 |
| Ammonium thiosulfite (70%) | 170.0 ml |
| Water to make | 1000 ml |
| pH | 6.7 |
| Stabilizing solution | |
| Formalin (37%) | 2.0 ml |
| Polyoxyethylene-p-monononylphenyl ether (average polymerization degree: 10) | 0.3 |
| Disodium ethylenediaminetetraacetate | 0.05 |
| Water to make | 1000 ml |
| pH | 5.0-8.0 |

EXAMPLE 2

Photosensitive material (Sample 201) consisting of layers of the following composition was prepared on an undercoated triacetate cellulose film.

| | (g) |
|---|---|
| First layer (Blue-sensitive emulsion layer) | |
| Silver iodobromide emulsion (AgI: 5 mol %) | 0.4 |
| ExY-16 | 1.0 |
| Solv-1 | 0.2 |
| ExS-9 | $2 \times 10^{-4}$ |
| Gelatin | 1.0 |
| Second layer (Intermediate layer) | |
| Gelatin | 1.0 |
| Cpd-1 | 0.03 |
| Solv-1 | 0.05 |
| Third layer (Green-sensitive emulsion layer) | |
| Silver iodobromide emulsion (AgI: 5 mol %) | 0.6 |
| ExS-4 | $5 \times 10^{-4}$ |
| ExS-6 | $0.3 \times 10^{-4}$ |
| ExS-5 | $2 \times 10^{-4}$ |
| ExM-9 | 0.45 |
| ExM-8 | 0.06 |
| Solv-1 | 0.5 |
| Gelatin | 1.0 |
| Fourth layer (First protective layer) | |
| Gelatin | 0.8 |
| UV-1 | 0.1 |
| Uv-2 | 0.2 |
| Solv-1 | 0.01 |
| Solv-2 | 0.01 |
| Fifth layer (Second protective layer) | |
| Gelatin | 0.45 |
| Poly(methyl methacrylate) particles (diameter: 1.5 μm) | 0.2 |
| H-1 | 0.4 |
| Cpd-3 | 0.5 |
| Cpd-4 | 0.5 |

In each layer a surface-active agent was added.

Sample 202 was prepared by repeating the same procedure as Sample 201, except that the first layer and the third layer of Sample 201 were exchanged with each other.

Samples 203 to 207 were prepared by repeating the same procedure as Sample 201, except that ExM-8 and ExM-9 were respectively changed to exemplified compounds (1), (2), (4), (11), and (12) in a mol amount equal to the sum of ExM-8 and ExM-9.

Each of these Samples 201 to 207 was subjected to an wedge exposure of 20 CMS of white light and then to the same development processing as Example 1. Comparing the sensitivity of blue-sensitive emulsion layer of each sample with each other, Samples 203 to 307 of the present invention had higher sensitivity than Sample 202. On the other hand sample 201 was much less sensitive compared with Sample 202. The reason for low sensitivity of Sample 201 is supposedly that the sufficient amount of blue light did not reach the blue-sensitive emulsion layer due to the absorption by yellow colored magenta coupler ExM-8 in the green-sensitive emulsion layer which is positioned nearer to light-exposed surface than the blue-sensitive emulsion layer. Thus, it is confirmed that the degree of freedom for designing the layer constitution of photosensitive material is increased by using the compound of the present invention as a masking material.

EXAMPLE 3

A multi-layer color photosensitive material (Sample 301) consisting of layers of the following composition was prepared on an undercoated triacetate cellulose film base.

Composition of Photosensitive Layers

In the following compositions, the coating amount of silver halide and colloidal silver are each indicated in g/m² in terms of silver, the coating amount of the coupler, additive, and gelatin are each indicated in g/m², and the coating amount of the sensitizing dye is indicated in mol per mol of silver halide. Symbols showing additives have meanings as shown below, but when having plural functions, one of them is shown as a representative:

UV: ultraviolet absorbent, Solv: high-boiling organic solvent, ExF: dye, ExS: sensitizing dye, ExC: cyan coupler, ExM: magenta coupler, ExY: yellow coupler, Cpd: additive.

| First layer: Antihalation layer | |
|---|---|
| Black colloidal silver | ... 0.2 |
| Gelatin | ... 1.3 |
| ExM-8 | ... 0.06 |
| UV-1 | ... 0.1 |
| UV-2 | ... 0.2 |
| Solv-1 | ... 0.01 |
| Solv-2 | ... 0.01 |
| Second layer: Intermediate layer | |
| Fine-grain silver bromide emulsion (average grain size: 0.07 μm) | ... 0.10 |
| Gelatin | ... 1.5 |
| UV-1 | ... 0.06 |
| UV-2 | ... 0.03 |
| ExC-2 | ... 0.02 |
| ExC-1 | ... 0.004 |
| Solv-1 | ... 0.1 |
| Solv-2 | ... 0.09 |
| Third layer: First red-sensitive emulsion layer | |
| Silver iodobromide emulsion (AgI: 12 mol %, inner high AgI-type, diameter corresponding to sphere: 0.3 μm, deviation coefficient of diameter: 29%, mixed grains of regular and twin crystals, diameter/thickness: 2.5) silver | ... 0.4 |
| Gelatin | ... 0.6 |
| ExS-1 | ... $1.0 \times 10^{-4}$ |
| ExS-2 | ... $3.0 \times 10^{-4}$ |
| ExS-3 | ... $1 \times 10^{-5}$ |
| ExC-3 | ... 0.06 |
| ExC-4 | ... 0.06 |
| ExC-7 | ... 0.04 |
| ExC-2 | ... 0.03 |
| Solv-1 | ... 0.03 |
| Solv-2 | ... 0.012 |
| Fourth layer: Second red-sensitive emulsion layer | |
| Silver iodobromide emulsion (AgI: 15 mol %, inner high AgI-type, diameter corresponding to sphere: 0.7 μm, deviation coefficient of diameter: 25%, mixed grains of regular and twin crystals, diameter/thickness: 4) silver | ... 0.7 |
| Gelatin | ... 0.5 |
| ExS-1 | ... $1 \times 10^{-4}$ |
| ExS-2 | ... $3 \times 10^{-4}$ |
| ExS-3 | ... $1 \times 10^{-5}$ |
| ExC-3 | ... 0.24 |
| ExC-4 | ... 0.24 |
| ExC-8 | ... 0.04 |
| ExC-2 | ... 0.04 |
| Solv-1 | ... 0.15 |
| Solv-3 | ... 0.10 |
| Fifth layer: Third red-sensitive emulsion layer | |
| Silver iodobromide emulsion (AgI: 10 mol %, inner high AgI-type, diameter corresponding to sphere: 0.8 μm, deviation coefficient of diameter: 16%, mixed grains of regular and twin crystals, diameter/thickness: 1.3) silver | ... 1.0 |
| Gelatin | ... 1.0 |
| ExS-1 | ... $1 \times 10^{-4}$ |
| ExS-2 | ... $3 \times 10^{-4}$ |
| ExS-3 | ... $1 \times 10^{-5}$ |
| ExC-6 | ... 0.13 |
| Solv-1 | ... 0.01 |
| Solv-2 | ... 0.05 |
| Sixth layer: Intermediate layer | |
| Gelatin | ... 1.0 |
| Cpd-1 | ... 0.03 |
| Solv-1 | ... 0.05 |
| Seventh layer: First green-sensitive emulsion layer | |
| Silver iodobromide emulsion (AgI: 12 mol %, inner high AgI-type, diameter corresponding to sphere: 0.3 μm, deviation coefficient of diameter: 28%, mixed grains of regular and twin crystals, diameter/thickness: 2.5) silver | ... 0.30 |
| ExS-4 | ... $5 \times 10^{-4}$ |
| ExS-6 | ... $0.3 \times 10^{-4}$ |
| ExS-5 | ... $2 \times 10^{-4}$ |
| Gelatin | ... 1.0 |
| ExM-9 | ... 0.2 |
| ExY-14 | ... 0.03 |
| ExM-8 | ... 0.03 |
| Solv-1 | ... 0.5 |
| Eighth layer: Second green-sensitive emulsion layer | |
| Silver iodobromide emulsion (AgI: 14 mol %, inner high AgI-type, diameter corresponding to sphere: 0.6 μm, deviation coefficient of diameter: 38%, mixed grains of regular and twin crystals, diameter/thickness: 4) silver | ... 0.4 |
| Gelatin | ... 0.5 |
| ExS-4 | ... $5 \times 10^{-4}$ |
| ExS-5 | ... $2 \times 10^{-4}$ |
| ExS-6 | ... $0.3 \times 10^{-4}$ |
| ExM-9 | ... 0.25 |
| ExM-8 | ... 0.03 |
| ExM-10 | ... 0.015 |
| ExY-14 | ... 0.01 |
| Solv-1 | ... 0.2 |
| Nineth layer: Third green-sensitive emulsion layer | |
| Silver iodobromide emulsion (AgI: 16 mol %, inner high AgI-type, diameter corresponding to sphere: 1.0 μm, deviation coefficient of diameter: 80%, mixed grains of regular and twin crystals, diameter/thickness: 1.2) silver | ... 0.85 |
| Gelatin | ... 1.0 |
| ExS-7 | ... $3.5 \times 10^{-4}$ |
| ExS-8 | ... $1.4 \times 10^{-4}$ |
| ExM-11 | ... 0.01 |
| ExM-12 | ... 0.03 |
| ExM-13 | ... 0.20 |
| ExM-8 | ... 0.02 |
| ExY14 | ... 0.02 |
| Solv-1 | ... 0.20 |
| Solv-2 | ... 0.05 |
| Tenth layer: yellow filter layer | |
| Gelatin | ... 1.2 |
| Yellow coloidal silver | ... 0.08 |

-continued

| | |
|---|---|
| Cpd-2 | ... 0.05 |
| Solv-1 | ... 0.3 |
| Eleventh layer: First blue-sensitive emulsion layer | |
| Silver iodobromide emulsion (AgI: 14 mol %, inner high AgI-type, diameter corresponding to sphere: 0.5 μm, deviation coefficient of diameter 15%, octahedral grain) silver | ... 0.4 |
| Gelatin | ... 1.0 |
| ExS-9 | ... $2 \times 10^{-4}$ |
| ExY-16 | ... 0.9 |
| ExY-14 | ... 0.07 |
| Solv-1 | ... 0.2 |
| Twelfth layer: Second blue-sensitive emulsion layer | |
| Silver iodobromide emulsion (AgI: 10 mol %, inner high AgI-type, diameter corresponding to sphere: 1.3 μm, deviation coefficient of diameter: 25%, mixed grains of regular and twin crystals, diameter/thickness: 4.5) silver | ... 0.5 |
| Gelatin | ... 0.6 |
| ExS-9 | ... $1 \times 10^{-4}$ |
| ExY-16 | ... 0.25 |
| Solv-1 | ... 0.07 |
| Thirteenth layer: First protective layer | |
| Gelatin | ... 0.8 |
| UV-1 | ... 0.1 |
| UV-2 | ... 0.2 |
| Solv-1 | ... 0.01 |
| Solv-2 | ... 0.01 |
| Fourteenth layer: Second protective layer | |
| Fine-grain silver bromide emulsion (average grain size: 0.07 μm) | ... 0.5 |
| Gelatin | ... 0.45 |
| Poly(methyl methacrylate) particles (particle diameter: 1.5 μm) | ... 0.2 |
| Cpd-3 | ... 0.5 |
| Cpd-4 | ... 0.5 |

In each layer described above, a surface-active agent was added as a coating aid. The thus-prepared sample is called Sample 301. Preparation of Samples 302 and 303.

Samples 302 and 303 were prepared by repeating the same procedure as Sample 301, except that ExC-3, ExC-4, and ExC-2 added in the third layer and in the fourth layer of Sample 301 were changed to those shown in Table 2.

TABLE 2

| | Coupler | |
|---|---|---|
| Sample | Third layer | Fourth layer |
| 301 (Comparative example) | ExC-3 (0.06) | ExC-3 (0.24) |
| | ExC-4 (0.06) | ExC-4 (0.24) |
| | ExC-2 (0.03) | ExC-2 (0.04) |
| 302 (This invention) | ExC-3 (0.045) | ExC-3 (0.22) |
| | ExC-4 (0.045) | ExC-4 (0.22) |
| | (25) (0.06) | (25) (0.08) |
| 303 (This invention) | ExC-3 (0.045) | ExC-3 (0.22) |
| | ExC-4 (0.045) | ExC-4 (0.22) |
| | (26) (0.06) | (26) (0.08) |

Note
( ): amount used

Thus thus-prepared Samples 301 to 303 were processed to pieces of 35 mm, and the pieces were subjected to exposure to light by taking a photograph of standard object followed by development according to the following processing process.

Each of color photograph which was prepared by printing the thus-obtained negative film on a color printing paper was bright, being correctly color corrected.

| | Processing Process (II) | | | |
|---|---|---|---|---|
| Step | Time (min.-sec.) | Temp. (°C.) | Replenisher amount | Tank Volume |
| Color development | 3-15 | 38 | 15 ml | 20 l |
| Bleaching | 6-30 | 38 | 10 ml | 40 l |
| Water washing | 2-10 | 35 | 10 ml | 20 l |
| Fixing (1) | 3-00 | 38 | 20 ml | 30 l |
| Fixing (2) | 4-20 | 38 | 20 ml | 30 l |
| Water Washing (1) | 1-05 | 35 | * | 10 l |
| Water washing (2) | 2-10 | 35 | 20 ml | 10 l |
| Stabilizing | 1-05 | 38 | 10 ml | 10 l |
| Drying | 4-20 | 55 | | |

Note:
replenisher amount is ml per 35 mm × 1 m
*counter current flow piping system from washing (2) to (1)

The carried-over amount of fixing solution to water-washing step was 2 ml per 35 mm width and 1 m length of the photosensitive material.

The composition of each processing solution is shown below.

| | Mother solution (g) | Replenisher (g) |
|---|---|---|
| Color developer | | |
| Diethylenetriamine-pentaacetate | 1.0 | 1.1 |
| 1-Hydroxyethylidene-1,1-diphosphonate | 3.0 | 3.2 |
| Sodium sulfite | 4.0 | 4.9 |
| Pottasium carbonate | 30.0 | 30.0 |
| Pottasium bromide | 1.4 | — |
| Pottasium iodide | 1.5 mg | — |
| Hydroxylamine sulfate | 2.4 | 3.6 |
| 4-(N-ethyl-N-β-hydroxyethylamino)-2-methylaniline sulfate | 4.5 | 7.2 |
| Water to make | 1.0 l | 1.0 l |
| pH | 10.05 | 10.10 |
| Bleaching solution | | |
| Ferric sodium ethylenediamine-tetraacetate trihydrate | 100.0 | 140.0 |
| Disodium ethylenediamine-tetraacetate | 10.0 | 11.0 |
| Ammonium bromide | 140.0 | 180.0 |
| Ammonium nitrate | 30.0 | 40.0 |
| Aquous ammonia (27%) | 6.5 ml | 2.5 ml |
| | 1.0 l | 1.0 l |
| Fixing (1) solution | | |
| Disodium ethylenediamine-tetraacetate | 0.5 | 1.0 |
| Sodium sulfite | 7.0 | 12.0 |
| Sodium hydrogensulfite | 5.0 | 9.5 |
| 3,6-Dithia-1,8-octanediol | 30.5 | 43.0 |
| Water to make | 1.0 l | 1.0 l |
| pH | 6.0–7.0 | 6.0–7.0 |
| Fixing (2) solution | | |
| Disodium ethylenediamine-tetraacetate | 0.5 | 1.0 |
| Sodium sulfite | 7.0 | 12.0 |
| Sodium hydrogensulfite | 5.0 | 9.5 |
| Ammonium thiosulfate aquous solution (70%) | 170.0 ml | 240.0 ml |
| Water to make | 1.0 l | 1.0 l |
| pH | 6.7 | 6.6 |
| Water washing solution | | |

(Both mother solution and replenisher are the same)
Tap water was treated by passing through a hybridtype column filled with an H-type strong acidic cation-exchange resin (Amberlite IR-120B, made by Rohm & Haas) and an OH-type strong alkaline anion-exchange resin (Amberlite IRA-400, made by the same company) to obtain water which contains calcium and magnesium ions of each below 3 mg/l. To the thus-treated water, 20 mg/l of sodium dichloroisocuanurate and 150 mg/l of sodium sulfate were added. The pH of this solution was in a range of 6.5 to 7.5.

| Stabilizing solution | Mother solution (g) | Replenisher (g) |
|---|---|---|
| Formalin (37%) | 2.0 ml | 3.0 ml |
| Polyoxyethylene-p-monononylphenyl ether (av. polymerization degree: 10) | 0.3 | 0.45 |
| Disodium ethylenediamine-tetraacetate | 0.05 | 0.08 |
| Water to make | 1.0 l | 1.0 l |
| pH | 5.0–8.0 | 5.0–8.0 |

Having described our invention as related to the embodiment, it is our intention that the invention be not limited by any of the details of the description, unless otherwise specified, but rather be construed broadly within its spirit and scope as set out in the accompanying claims.

What is claim is:

1. A silver halide photographic color negative material having at least one silver halide emulsion layer on a base, which comprises a color negative containing at least one compound having a dye precursor residue represented by the following formula (II):

A-L-Dp-(Sol)$_n$     (II)

wherein A represents a coupler residue or a redox group which is capable of splitting off from the L-Dp-(Sol)$_n$ portion to formula II by a reaction with the oxidized product of a developing agent, said L-Dp-(Sol)$_n$ portion of formula (II) is capable of dissolving into a developing solution, L represents a divalent linking group, Dp represents a dye precursor residue capable of producing a dye having absorption in the visible light range by a hydrolysis reaction in the presence of a silver (I) ion or a soluble silver complex which is present in the developing solution, fixing solution, bleach-fixing solution or a processing solution, Sol represents a water-soluble group, and n is an integer of 1 or more.

2. The photographic material as claimed in claim 1, wherein A represents a coupler residue.

3. The photographic material as claimed in claim 1, wherein the compound represnted by formula (II) is one that reacts with the oxidized product of a developing agent produced along with the development of a silver halide in the developing solution, thereby releasing L-Dp-(Sol)$_n$.

4. The photographic material as claimed in claim 1, wherein the compound represented by formula (II) is used in association with a dye-forming coupler for conventional photography according to coupling color-forming system employing a paraphenylenediamine-type color-developing agent.

5. The photographic material as claimed in claim 1, wherein L-Dp-(Sol)$_n$ of the compound represented by formula (II) diffuses into the processing solution after splitting off from A.

6. The photographic material as claimed in claim 1, wherein the compound represented by formula (II) is converted into a dye that has absorption in the visible light range by siliver(I) ions or a soluble silver complex present uniformly in the emulsion layer at the time of the developing process.

7. The photographic material as claimed in claim 1, wherein the compound represented by formula (II) provides for masking for color-correction.

8. The photographic material as claimed in claim 1, wherein A of the compound represnted by formula (II) is a coupler residue selected from the group consisting of yellow-coupler residues, magenta-coupler residues, cyan-coupler residues, and non-dye-forming coupler residues.

9. The photographic material as claimed in claim 1, wherein A of the compound represented by formula (II) is a coupler residue selected from the group consisting of coupler residues represented by the following formulae (Cp-1), (Cp-2), (Cp-3), (Cp-4), (Cp-5), (Cp-6), (Cp-7), (Cp-8), and (Cp-9):

Formula (Cp-1)

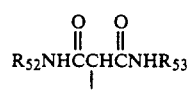

Formula (Cp-2)

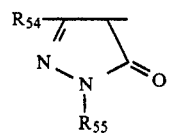

Formula (Cp-3)

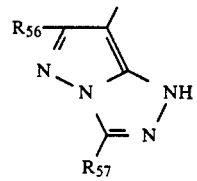

Formula (Cp-4)

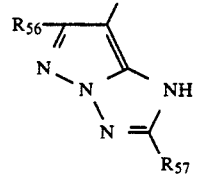

Formula (Cp-5)

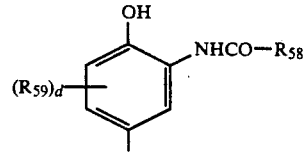

Formula (Cp-6)

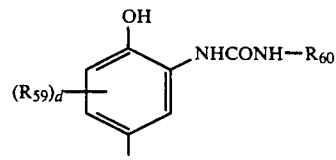

Formula (Cp-7)

-continued

Formula (Cp-8)

[Structure: naphthalene with OH, CONH-$R_{61}$, and $(R_{62})_e$ substituents]

and

Formula (Cp-9)

[Structure: indanone with $(R_{63})_e$ substituent]

wherein $R_{51}$ represents an aliphatic group, an aromatic group, or a heterocyclic group; $R_{52}$ and $R_{53}$ each represent an aromatic group or a heterocyclic group; $R_{54}$ has the same meaning as that of $R_{51}$, or represents $R_{41}CON-$, $R_{41}N-$, $R_{41}SO_2N-$, $R_{41}S-$, $R_{43}O-$, $R_{45}NCON-$,
$\;\;\;\;|\;\;\;\;\;\;\;\;\;\;|\;\;\;\;\;\;\;\;\;\;\;\;\;\;|\;\;\;\;\;\;\;\;\;\;\;\;\;\;\;\;\;\;\;\;\;\;\;\;\;\;\;\;\;\;\;\;\;\;\;\;\;\;\;|\;\;|$
$\;\;R_{43}\;\;\;\;\;\;\;R_{43}\;\;\;\;\;\;\;\;\;\;R_{43}\;\;\;\;\;\;\;\;\;\;\;\;\;\;\;\;\;\;\;\;\;\;\;\;\;\;\;\;\;\;\;\;R_{43}\;R_{44}$ $R_{41}OOC-$, $R_{44}N-CO$,
$\;\;\;\;\;\;\;\;\;\;\;\;\;\;\;\;\;|$
$\;\;\;\;\;\;\;\;\;\;\;\;\;\;\;R_{43}$ or $N\equiv C-$; $R_{55}$ has the same meaning as that of $R_{51}$; $R_{56}$ and $R_{57}$ each represent a hydrogen atom, an aliphatic group, an aromatic group, a heterocyclic group, $R_{41}S-$, $R_{43}O-$, $R_{41}CON-$, $R_{41}N-$, $R_{43}NCON-$, or $R_{41}SO_2N-$;
$\;\;\;\;|\;\;\;\;\;\;\;\;\;\;|\;\;\;\;\;\;\;\;\;\;|\;\;|\;\;\;\;\;\;\;\;\;\;\;\;\;\;\;\;|$
$\;\;R_{43}\;\;\;\;\;\;\;R_{43}\;\;\;\;\;\;R_{44}\;R_{45}\;\;\;\;\;\;\;\;R_{43}$ $R_{58}$ has the same meaning as that of $R_{51}$; $R_{59}$ has the same meaning as that of $R_{51}$, or represents $R_{41}CON-$, $R_{41}OCON-$, $R_{41}SO_2N-$,
$\;\;\;\;|\;\;\;\;\;\;\;\;\;\;\;\;|\;\;\;\;\;\;\;\;\;\;\;\;\;|$
$\;\;R_{43}\;\;\;\;\;\;\;\;R_{43}\;\;\;\;\;\;\;\;\;R_{43}$ $R_{43}NCON-$, $R_{43}NSO_2N-$,
$\;\;|\;\;\;\;\;\;\;\;\;\;|\;\;\;\;|\;\;\;\;\;\;\;\;|$
$R_{44}\;\;\;\;\;R_{45}\;\;\;R_{44}\;\;\;\;R_{45}$ $R_{41}O-$. $R_{41}S-$, a halogen atom, or $R_{41}N-$;
$\;\;\;|$
$\;R_{43}$ d is from 0 to 3, when there are a plurality of d's, $R_{59}$'s represent the same substituent or different substituent, and $R_{59}$'s may be divalent groups linked to form a cyclic structure, which include

[Three cyclic structures shown with $(R_{41})_f$, $(R_{41})_g$, and $(R_{41})_g$ substituents], and wherein f is an integer of 0 to 4, and g is an integer of 0 to 2; $R_{60}$ and $R_{61}$ each have the same meaning as that of $R_{51}$; $R_{62}$ has the same meaning as that of $R_{51}$, or represents $R_{41}CONH-$, $R_{41}OCONH-$, $R_{41}SO_2NH-$, $R_{43}NCON-$, $R_{43}NSO_2N-$,
$\;\;|\;\;\;\;\;\;\;\;\;\;|\;\;\;\;|\;\;\;\;\;\;\;\;|$
$R_{44}\;\;\;\;\;R_{45}\;\;\;R_{44}\;\;\;\;R_{45}$ $R_{43}O-$, $R_{41}S-$, a halogen atom, or $R_{41}N-$;
$\;\;\;|$
$\;R_{43}$ $R_{63}$ has the same meaning as that of $R_{51}$, or represents $R_{43}CON-$, $R_{43}NCO-$, $R_{41}SO_2N-$, $R_{43}NSO_2-$,
$\;\;\;\;|\;\;\;\;\;\;\;\;\;\;\;|\;\;\;\;\;\;\;\;\;\;\;\;|\;\;\;\;\;\;\;\;\;\;\;\;\;|$
$\;\;R_{44}\;\;\;\;\;\;\;R_{44}\;\;\;\;\;\;\;\;\;R_{44}\;\;\;\;\;\;\;\;\;R_{44}$ $R_{41}SO_2-$, $R_{43}OCO-$, $R_{43}O-SO_2-$, a halogen atom, a nitro group, a cyano group, or $R_{43}CO-$; e is an integer of 0 to 4, when there are a plurality of $R_{62}$'s or $R_{63}$', they may be the same or different; and in the above definitions, $R_{41}$ represents an aliphatic group, an aromatic group, or a heterocyclic group; $R_{42}$ represent an aromatic group or a heterocyclic group; and $R_{43}$, $R_{44}$, and $R_{45}$ each represent a hydrogen atom, an aliphatic group, an aromatic group, or a heterocyclic group.

10. The photographic material as claimed in claim 1, wherein A of the compound represented by formula (II) is a redox group represented by the following formula (III):

$$A_1\text{-}P\text{-}(X=Y)_l\text{-}Q\text{-}A_2 \quad \text{formula (III)}$$

wherein P and Q independently each represent an oxygen atom or a substituted or unsubstituted imino group, at least one of X and Y that is l in number represents a methine group having, as a substituent, $-(L)\text{-}Dp\text{-}(Sol)_n$, wherein L represents a divalent linking group, Dp represents a dye precursor residue capable of producing a dye having absorption in the visible light range by a reaction with a siliver(I) ion or a soluble silver complex, Sol represents a water-soluble group, and n is an integer of 1 or larger, and other X and Y each represent a substituted or unsubstituted methine group or a nitrogen atom, l is integer of 1 to 3 (X that is l in number and Y that is l in number may be the same or different), $A_1$ and $A_2$ each represent a hydrogen atom or a group that can be removed by a alkali, and any two substituents of P, X, Y, Q, $A_1$, and $A_2$ may be divalent groups that bond with each other to form a cyclic structure.

11. The photographic material as claimed in claim 10, wherein the group represented by formula (III) is represented by the following formula (IV) or (V):

Formula (IV)

[Structure: benzene ring with $P-A_1$, $Q-A_2$, $(R_{64})_q$, and * substituents]

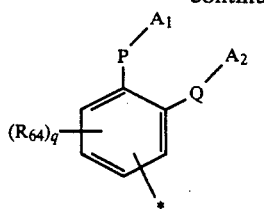

Formula (V)

wherein the mark * represents the position wherein -L-Dp-(Sol)$_n$ bonds, P, Q, A$_1$, and A$_2$ have the same meaning as defined for formula (III), R$_{64}$ represents a substituent, q is an integer of 0 to 3, and when q is 2 or over, two or more R$_{64}$'s may be the same or different, and when two R$_{64}$'s are substituents on adjacent carbon atoms, they may be divalent groups that bond with each other to form a cyclic structure.

12. The photographic material as claimed in claim 1, wherein the linking group represented by L in formula (II) is a divalent linking group represented by the following formula (VI):

  formula (VI)

wherein the mark * represents the position where it bonds to A of formula (II), the mark ** represents the position where it bonds to Dp of formula (II), Z$_4$ represents an oxygen atom, a sulfur atom, or

L$_1$ represents simply a bond or a divalent group, and R$_{71}$ represents a hydrogen atom, an aliphatic group, an aromatic group, or a heterocyclic group.

13. The photographic material as claimed in claim 1, wherein the dye precursor residue represented by Dp in formula (II) is represented by the following formula (VII):

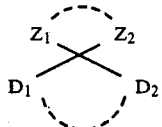

Formula (VII)

wherein Z$_1$ and Z$_2$ may be the same or different, Z$_1$ represents R$_{74}$S—, Z$_2$ represents R$_{75}$S—, R$_{75}$O—,

to form a ring, R$_{74}$ and R$_{75}$ each represent an aliphatic group, an aromatic group, or a heterocyclic group, R$_{76}$ represents a hydrogen atom, an aliphatic group, an aromatic group, or a heterocyclic group, D$_1$ and D$_2$, which may be the same or different, represent groups that can produce a dye that has absorption whose molecular extinction coefficient is 1,000 or over in the visible light range, with a carbonyl group or an imino group between them, and D$_1$ and D$_2$ may bond together to form a 5- to 8-membered ring.

14. The photographic material as claimed in claim 13, wherein the dye that is produced when the compound represented by formula (VII) and a silver(I) ion or a soluble silver complex react is one represented by formula (VIII):

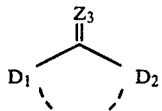

Formula (VIII)

wherein Z$_3$ represents an oxygen atom or =N—R$_{77}$, D$_1$ and D$_2$, which may be the same or diffferent, represent groups that can produce a dye that has absorption whose molecular extinction coefficient is 1,000 or over in the visible light range, with a carbonyl group or an imino group between them, and D$_1$ and D$_2$ may bond together to form a 5- to 5-membered ring, and R$_{77}$ represents a hydrogen atom, an aliphatic group, an aromatic group, or a heterocyclic group.

15. The photographic material as claimed in claim 1, wherein the water-soluble group represented by Sol in the compound represented by formula (II) is a carboxyl group or a sulfo group, or their salt, a hydroxyl group, or a sulfonic acid group or its salt.

16. The photographic material as claimed in claim 1, wherein the compound represented by formula (II) is used in such an amount that the absorbence at the absorption maximum of the produced dye is in the range of 0.05 to 1.0.

17. The photographic material as claimed in claim 1, wherein the compound represented by formula (II) is used in such an amount that the absorbence at the absorption maximum of the produced dye is in the range of 0.1 to 0.7.

18. The photographic material as claimed in claim 1, wherein the silver halide contained in the silver halide emulsion layer is silver iodobromide, silver iodochloride, or silver iodobromochloride which contains silver iodide of 30 mol % or less.

19. A silver halide photographic color negative material having at least one silver halide emulsion layer on a base, which comprises a color negative containing at least one compound having a dye precursor residue represented by the following formula (II):

A-L-Dp-(Sol)$_n$    (II)

wherein A represents a coupler residue or a redox group which is capable of splitting off from the L-Dp-(Sol)$_n$ portion of formula II by a reaction with the oxidized product of a developing agent, said L-Dp-(Sol)$_n$ portion of formula (II) is capable of dissolving into a developing solution, L represents a divalent linking group, Dp represents a dye precursor residue capable of producing a dye having absorption in the visible light range by a hydrolysis reaction in the presence of a silver(I) ion or a soluble silver complex which is present in the range of 1.0×10$^4$ to 2.0 mol/l Sol represents a water-soluble group, and n is an integer of 1 or more.

* * * * *